US010956347B2

(12) United States Patent
Mishima

(10) Patent No.: US 10,956,347 B2
(45) Date of Patent: Mar. 23, 2021

(54) DATA TRANSFER DEVICE, ARITHMETIC PROCESSING DEVICE, AND DATA TRANSFER METHOD

(71) Applicant: FUJITSU LIMITED, Kawasaki (JP)

(72) Inventor: Masahiro Mishima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/177,579

(22) Filed: Nov. 1, 2018

(65) Prior Publication Data
US 2019/0146935 A1 May 16, 2019

(30) Foreign Application Priority Data
Nov. 16, 2017 (JP) .............................. JP2017-220674

(51) Int. Cl.
G06F 13/28 (2006.01)
G06F 3/06 (2006.01)

(52) U.S. Cl.
CPC ............ G06F 13/28 (2013.01); G06F 3/061 (2013.01); G06F 3/0656 (2013.01); G06F 3/0671 (2013.01)

(58) Field of Classification Search
CPC .................................. G06F 17/30; G06F 12/00
See application file for complete search history.

(56) References Cited

U.S. PATENT DOCUMENTS

| 5,890,202 | A * | 3/1999 | Tanaka | G06F 3/061 711/111 |
| 7,050,384 | B2 * | 5/2006 | Sasaki | G11B 20/10527 369/275.3 |
| 7,495,669 | B2 * | 2/2009 | Ushida | G06T 1/0007 345/537 |
| 9,830,675 | B2 * | 11/2017 | Chida | G06T 1/60 |
| 2002/0174292 | A1 * | 11/2002 | Morita | G06F 13/161 711/105 |

(Continued)

FOREIGN PATENT DOCUMENTS

JP 10-222460 8/1998
JP 2006-004340 1/2006

Primary Examiner — Getente A Yimer
(74) Attorney, Agent, or Firm — Fujitsu Patent Center

(57) ABSTRACT

An apparatus includes a processor, first and second request-controllers, and a buffer. The processor divides a data-transfer request into transfer-requests including first and second transfer-requests. When, within a memory, an end-address of readout data based on the first transfer-request is adjacent to a head-address of readout data based on the second transfer-request, the processor sets end-adjacency information in the first transfer-request and sets head-adjacency information in the second transfer-request. Then, the first request-controller sets first adjacency information in a first readout-request for a readout end-address of the first transfer-request. The second request-controller sets second adjacency information in a second readout-request for a readout head-address of the second transfer-request. In response to the first readout-request, the buffer retains data read out from the memory, and outputs the data to the first request-controller. In response to the second readout-request, the buffer outputs the retained data to the second request-controller.

12 Claims, 14 Drawing Sheets

(56) References Cited

U.S. PATENT DOCUMENTS

| | | | |
|---|---|---|---|
| 2003/0126354 A1* | 7/2003 | Kahn | G06F 12/0215 711/105 |
| 2005/0114616 A1* | 5/2005 | Tune | G06F 12/1441 711/163 |
| 2014/0047212 A1* | 2/2014 | Nomoto | G06F 15/80 712/29 |
| 2014/0059052 A1* | 2/2014 | Yamamoto | G06F 7/32 707/741 |
| 2014/0164443 A1* | 6/2014 | Genc | G06F 16/214 707/809 |

* cited by examiner

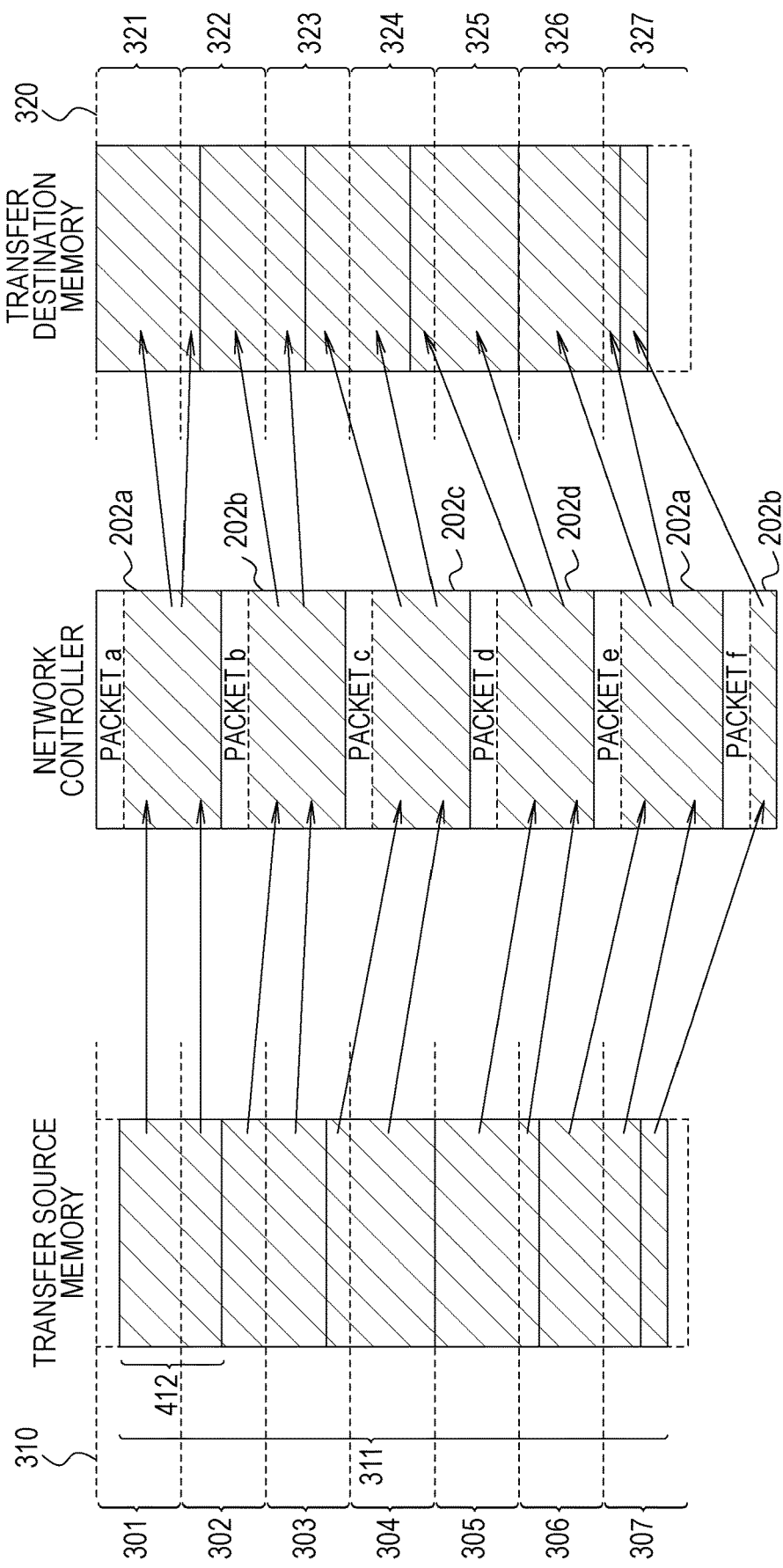

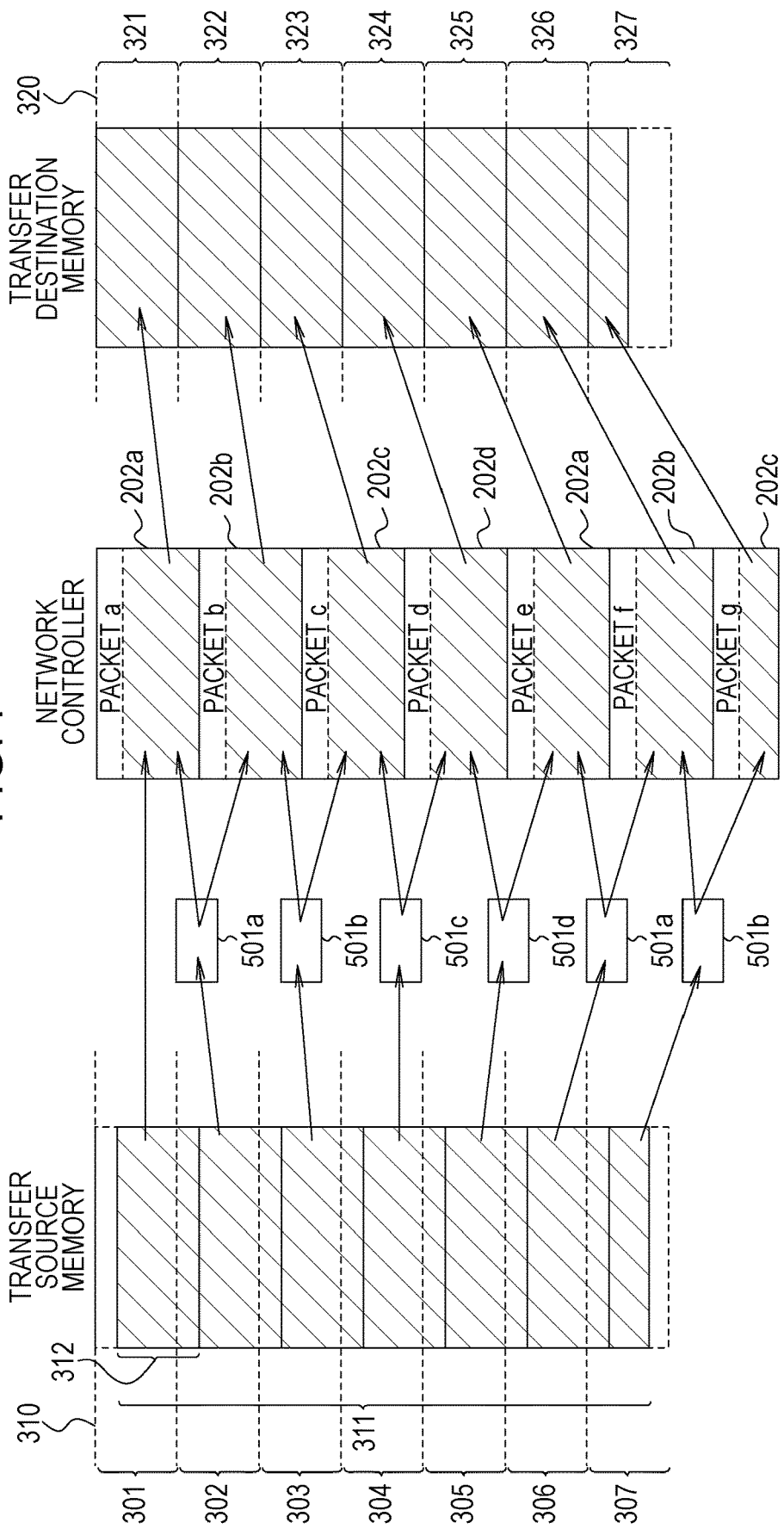

FIG. 13

DATA TRANSFER DEVICE, ARITHMETIC PROCESSING DEVICE, AND DATA TRANSFER METHOD

CROSS-REFERENCE TO RELATED APPLICATION

This application is based upon and claims the benefit of priority of the prior Japanese Patent Application No. 2017-220674, filed on Nov. 16, 2017, the entire contents of which are incorporated herein by reference.

FIELD

The embodiment discussed herein is related to a data transfer device, an arithmetic processing device, and a data transfer method.

BACKGROUND

There is known a direct memory access (DMA)transfer control device including a configuration for DMA-transferring, via a bus having a bus width of a plurality of bytes, continuous data stored in a transfer source to a transfer destination based on control of external control means (see Japanese Laid-open Patent Publication No. 2006-4340). Transfer-parameter setting means respectively acquires a transfer source start address and a transfer destination start address of the transfer destination of the continuous data stored in the transfer source and a data size of the continuous data from the external control means and sets the transfer source start address, the transfer destination start address, and the data size. Data shift means sequentially reads out, based on the transfer source start address set by the transfer-parameter setting means, the continuous data stored in the transfer destination while data-shifting the continuous data to match an alignment boundary for the bus width and stores the continuous data. The data shift means sequentially reads out, based on the transfer destination start address set by the transfer-parameter setting means, the stored continuous data while data-shifting the continuous data to match the alignment boundary for the bus width and stores the continuous data in the transfer destination.

There is known a data-transfer control device that performs data transfer between two types of memories having different access units (see Japanese Laid-open Patent Publication No. 10-222460). The data-transfer control device sequentially reads out data having any data length with any address of a supply-side memory of data as a start address and sequentially writes the data having the any data length with any address of a storage-side memory of the data as a start address.

SUMMARY

According to an aspect of the embodiments, an apparatus includes a processor, first and second request-controllers, and a buffer. The processor divides a data-transfer request into transfer-requests including first and second transfer-requests. When, within a memory, an end-address of readout data based on the first transfer-request is adjacent to a head-address of readout data based on the second transfer-request, the processor sets end-adjacency information in the first transfer-request and sets head-adjacency information in the second transfer-request. Then, the first request-controller sets first adjacency information in a first readout-request for a readout end-address of the first transfer-request. The second request-controller sets second adjacency information in a second readout-request for a readout head-address of the second transfer-request. In response to the first readout-request, the buffer retains data read out from the memory, and outputs the data to the first request-controller. In response to the second readout-request, the buffer outputs the retained data to the second request-controller.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining another data transfer method of the network controller illustrated in FIG. 2;

FIG. 7 is a diagram for explaining a data transfer method of the network controller according to the embodiment;

FIG. 13 is a time chart illustrating a processing example of the network controller.

DESCRIPTION OF EMBODIMENTS

As a memory, there is a memory that performs readout for each readout unit block corresponding to a memory cache. In that case, only a part of data in the readout unit block is unable to be read. Therefore, readout efficiency of the memory is sometimes deteriorated.

It is preferable to improve readout efficiency of a memory.

Figure 1:
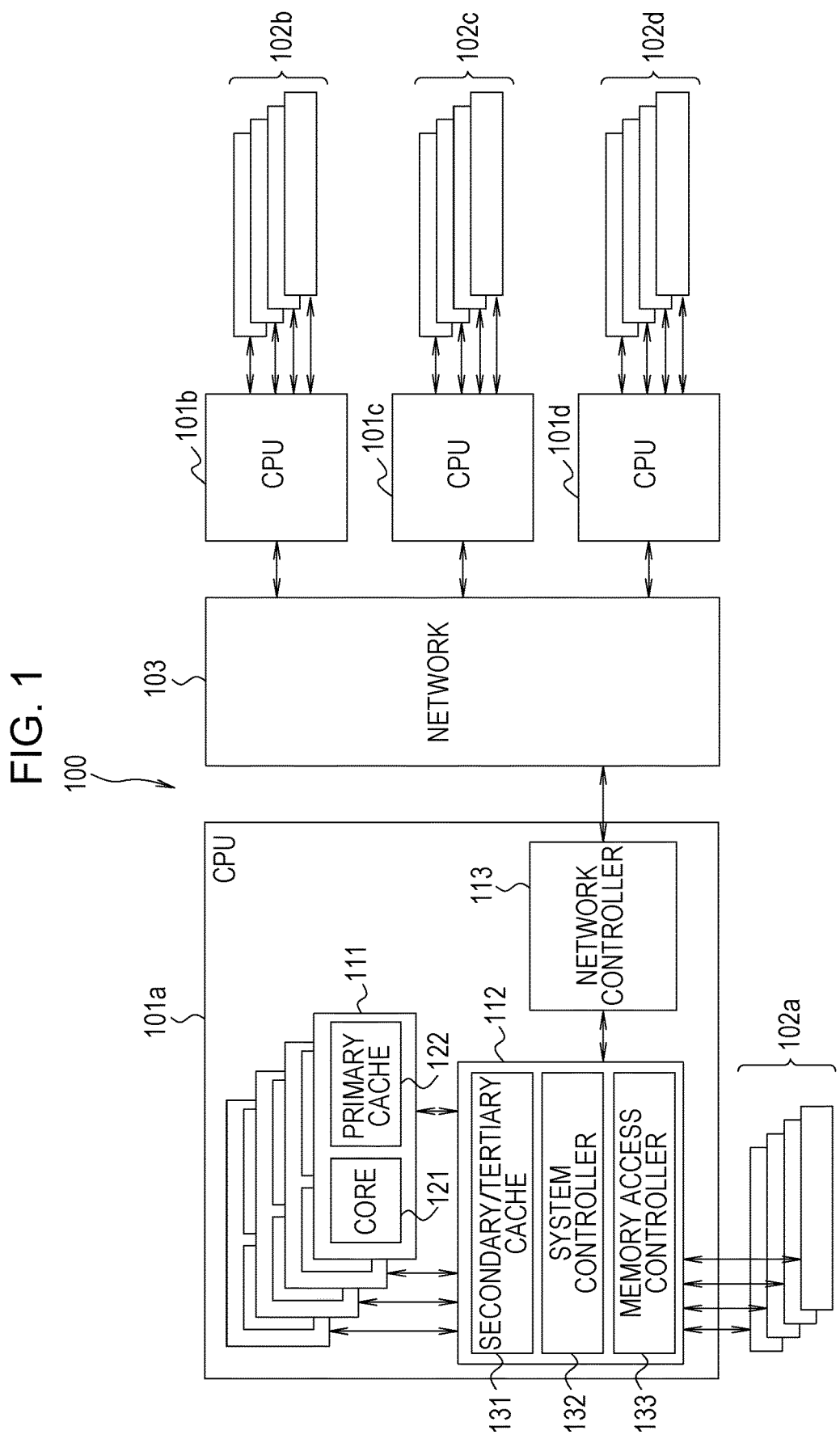
FIG. 1 is a diagram illustrating a configuration example of an arithmetic processing system according to an embodiment.

FIG. 1 is a diagram illustrating a configuration example of an arithmetic processing system 100 according to an embodiment. The arithmetic processing system 100 includes a plurality of central processing units (CPUs) 101a to 101d, pluralities of memories 102a to 102d, and a network 103. The memories 102a are connected to the central processing unit 101a. The memories 102b are connected to the central processing unit 101b. The memories 102c are connected to the central processing unit 101c. The memories 102d are connected to the central processing unit 101d. The memories 102a to 102d are, for example, random access memories (RAMs). The number of each of the memories 102a to 102d does not have to be the same as the number of core units 111. The central processing units 101a to 101d are connected to one another via the network 103.

The central processing units 101a to 101d respectively include pluralities of core units 111, control units 112, and network controllers 113. Each of the pluralities of core units 111 include cores 121 and primary caches 122. The control units 112 include secondary/tertiary caches 131, system controllers 132, and memory access controllers 133. The cores 121 perform arithmetic processing. The primary caches 122 of the central processing unit 101a store data of a part of the memories 102a. The secondary/tertiary caches 131 of the central processing unit 101a store data of a part of the memories 102a. The system controller 132 of the central processing unit 101a controls the entire central processing unit 101a. The memory access controller 133 of the central processing unit 101a controls readout from and writing in the memories 102a. The central processing units 101b to 101d have the same configuration as the configuration of the central processing unit 101a.

The network controllers 113 are data transfer devices that perform data transfer of remote direct memory access (RDMA) among the memories 102a to 102d. The RDMA transfer may perform data transfer among the memories 102a to 102d at high speed. For example, the network controller 113 of the central processing unit 101a may transfer data from the memory 102a to any one of the memories 102b to 102d.

An example is explained in which the network controller 113 of the central processing unit 101a transfers data from the memory 102a to the memory 102b. In the central processing unit 101a, the core 121 writes a data transfer request (a data transfer command) in a command region of the memory 102a via the control unit 112 and outputs a start signal to the network controller 113. When the start signal is input to the network controller 113, the network controller 113 reads out the data transfer request from the command region of the memory 102a via the control unit 112. The core 121 may directly output the data transfer request to the network controller 113. The data transfer request includes information concerning an address of the memory 102a at a transfer source, an identifier of the central processing unit 101b at a transfer destination, an address of the memory 102b at the transfer destination, and a transfer data length. The network controller 113 reads out, based on the data transfer request, data from the memory 102a at the transfer source via the control unit 112 and generates one or a plurality of packets (including a write request) based on the read-out data. The network controller 113 outputs the one or the plurality of packets to the central processing unit 101b at the transfer destination via the network 103. In the central processing unit 101b, when the one or the plurality of packets are input to the network controller 113, the network controller 113 writes a payload of the one or the plurality of packets in the memory 102b via the control unit 112.

Figure 2:
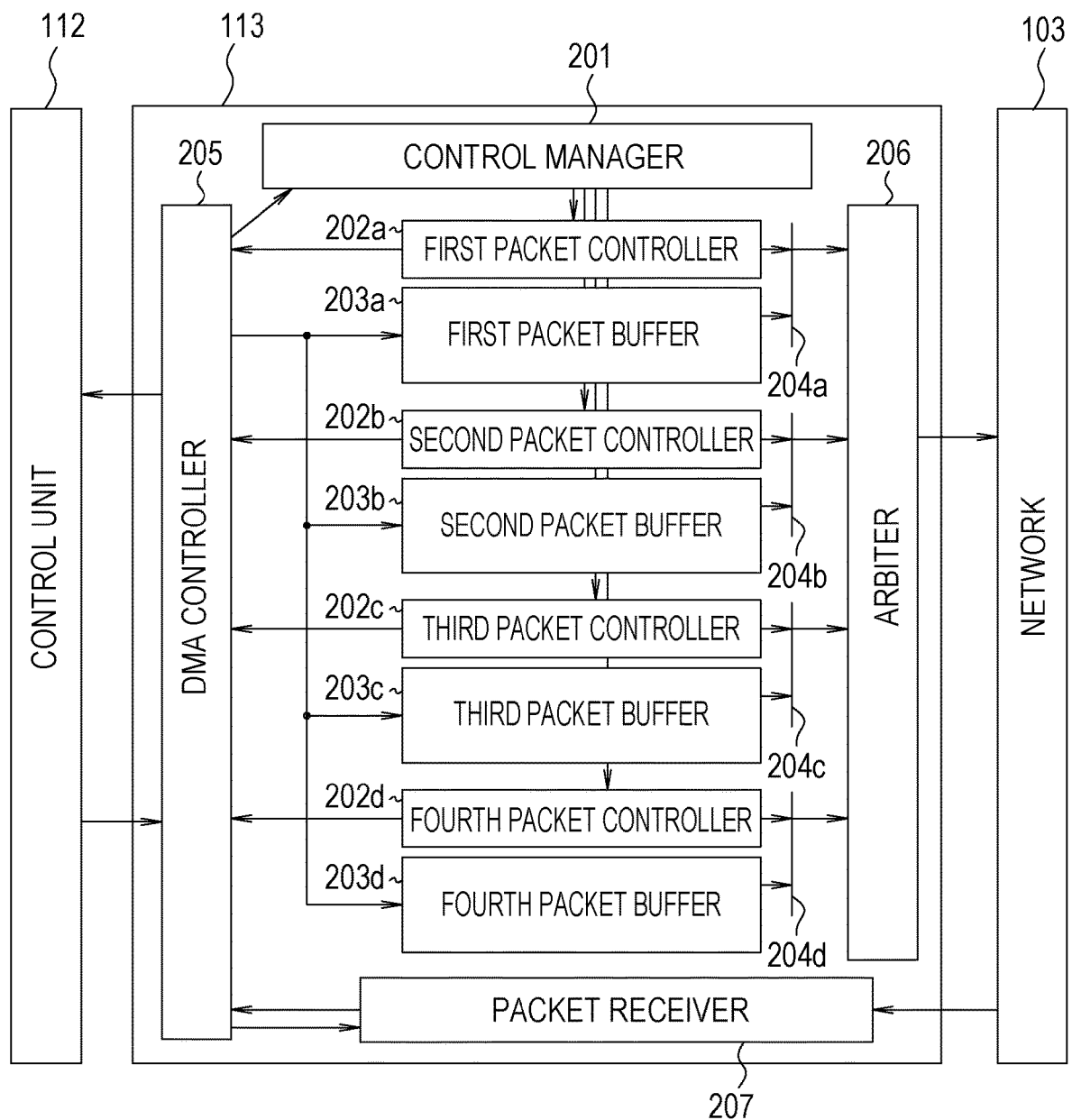
FIG. 2 is a diagram illustrating a configuration example of a network controller according to a basic technique.

FIG. 2 is a diagram illustrating a configuration example of the network controller 113 according to a basic technique. The network controller 113 includes a control manager 201, a first packet controller 202a, a first packet buffer 203a, a second packet controller 202b, a second packet buffer 203b, a third packet controller 202c, a third packet buffer 203c, a fourth packet controller 202d, a fourth packet buffer 203d, selectors 204a to 204d, a direct memory access (DMA), controller 205, an arbiter 206, and a packet receiver 207.

Figure 3:
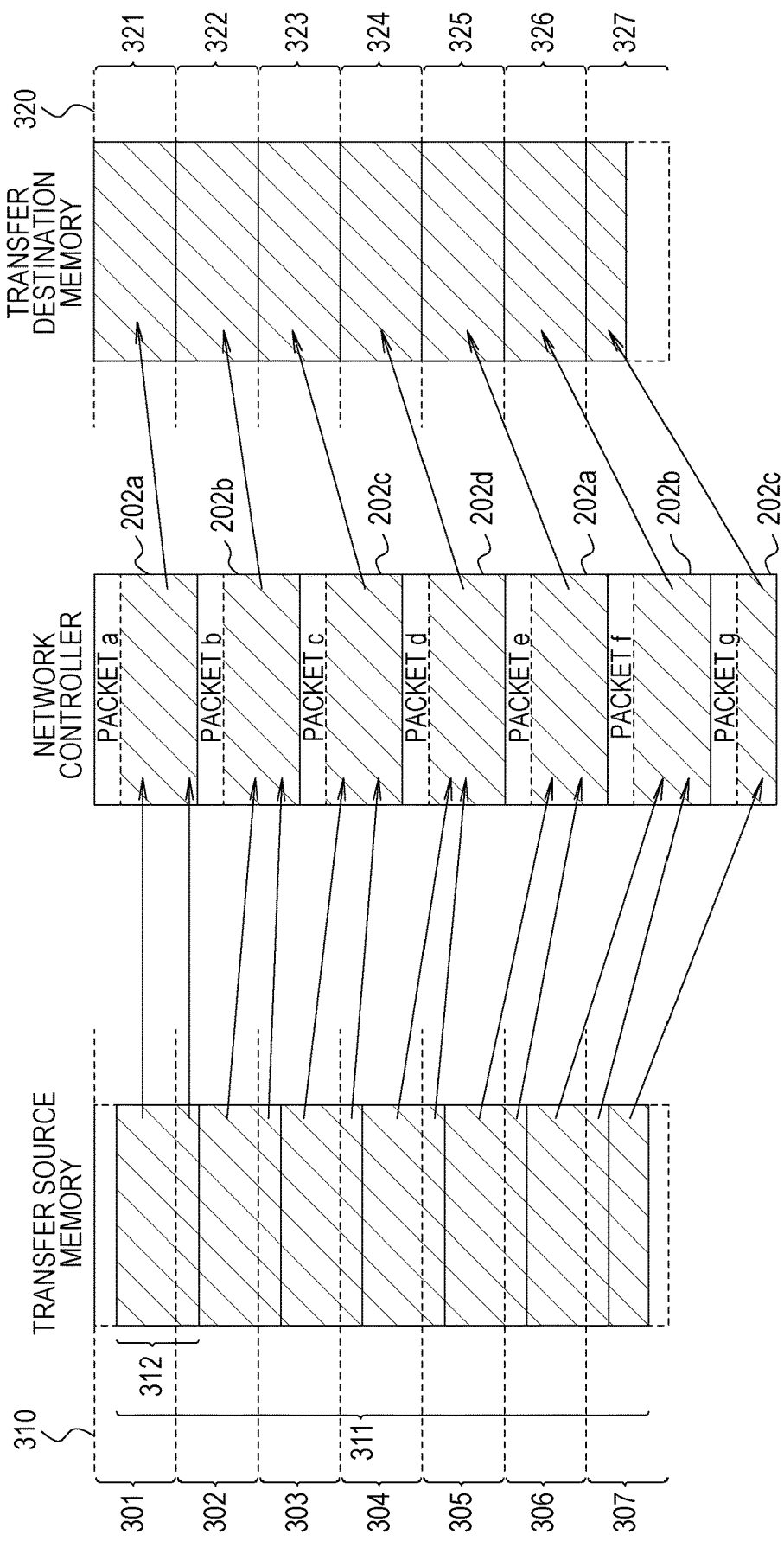
FIG. 3 is a diagram for explaining a data transfer method of the network controller illustrated in FIG. 2.

FIG. 3 is a diagram for explaining a data transfer method of the network controller 113 illustrated in FIG. 2. The memory 102a at a transfer source includes aligns 310 indicating boundaries among readout unit blocks (access unit blocks) 301 to 307. Sizes of the readout unit blocks 301 to 307 are respectively the same as a size of a cache line. The central processing unit 101a efficiently performs management of cache coherence. Therefore, granularity of a memory access is limited by the aligns 310 having the cache line size. For example, when the cache line size is 256 bytes, the readout unit blocks 301 to 307 of the memory 102a at the transfer source are respectively 256 bytes. The memory 102a at the transfer source performs readout for each of the readout unit blocks 301 to 307. The memory 102a at the transfer source is unable to read out only a part of data in the readout unit block 301.

Similarly, the memory 102b at a transfer destination includes aligns 320 indicating boundaries among write unit blocks (access unit blocks) 321 to 327. Sizes of the write unit blocks 321 to 327 are respectively the same as the size of the cache line. For example, when the cache line size is 256 bytes, the write unit blocks 321 to 327 are respectively 256 bytes. The memory 102b at the transfer destination performs writing for each of the write unit blocks 321 to 327. The memory 102b at the transfer destination is unable to write only a part of data in the write unit block 321.

A data transfer request generated by the core 121 is input to the control manager 201. The data transfer request includes information concerning an address of the memory 102a at the transfer source, an identifier of the central processing unit 101b at the transfer destination, an address of the memory 102b at the transfer destination, and a transfer data length. For example, the data transfer request is a request for transferring a payload (data) 311 of the memory 102a at the transfer source to the memory 102b at the transfer destination.

The control manager 201 analyzes the data transfer request and divides the data transfer request into seven packet transfer requests for packets "a" to "g" in packet units. Payload lengths 312 of the respective packets "a" to "g" are respectively the same as the length of the write unit block 321 of the memory 102b at the transfer destination. The payload 311 is divided in payload length 312 units. The control manager 201 outputs the packet transfer request for the packet "a" to the first packet controller 202a, outputs the packet transfer request for the packet "b" to the second packet controller 202b, outputs the packet transfer request for the packet "c" to the third packet controller 202c, and outputs the packet transfer request for the packet "d" to the fourth packet controller 202d. The control manager 201 outputs the packet transfer request for the packet "e" to the first packet controller 202a, outputs the packet transfer request for the packet "f" to the second packet controller 202b, and outputs the packet transfer request for the packet "g" to the third packet controller 202c.

The first packet controller 202a reads out the readout unit block 301 of the memory 102a at the transfer source and thereafter reads out the readout unit block 302 of the memory 102a at the transfer source via the DMA controller 205 and the control unit 112 based on the packet transfer request for the packet "a". Subsequently, the first packet controller 202a writes the readout unit blocks 301 and 302 in the first packet buffer 203a and generates the packet "a" based on a part of data of the readout unit block 301 and a part of data of the readout unit block 302. Subsequently, the first packet controller 202*a* outputs a packet transmission request signal to the arbiter 206 via the selector 204*a*. When a plurality of packet transmission request signals of the first to fourth packet controllers 202*a* to 202*d* conflict, the arbiter 206 performs arbitration and outputs a permission signal to any one of the first to fourth packet controllers 202*a* to 202*d*. When the permission signal is input to the first packet controller 202*a*, the first packet controller 202*a* outputs the packet "a" (including a write request) to the central processing unit 101*b* at the transfer destination via the arbiter 206 and the network 103. The packet receiver 207 of the central processing unit 101*b* writes a payload of the packet "a" as the write unit block 321 of the memory 102*b* at the transfer destination via the DMA controller 205 and the control unit 112.

Similarly, the second packet controller 202*b* reads out the readout unit block 302 of the memory 102*a* at the transfer source and thereafter reads out the readout unit block 303 of the memory 102*a* at the transfer source via the DMA controller 205 and the control unit 112 based on the packet transfer request for the packet "b". Subsequently, the second packet controller 202*b* writes the readout unit blocks 302 and 303 in the second packet buffer 203*b* and generates the packet "b" based on a part of data of the readout unit block 302 and a part of data of the readout unit block 303. Subsequently, the second packet controller 202*b* outputs a packet transmission request signal to the arbiter 206 via the selector 204*b*. When a permission signal is input to the second packet controller 202*b* from the arbiter 206, the second packet controller 202*b* outputs the packet "b" (including a write request) to the central processing unit 101*b* at the transfer destination via the arbiter 206 and the network 103. The packet receiver 207 of the central processing unit 101*b* writes a payload of the packet "b" as the write unit block 322 of the memory 102*b* at the transfer destination via the DMA controller 205 and the control unit 112.

Similarly, the third packet controller 202*c* reads out the readout unit block 303 of the memory 102*a* at the transfer source and thereafter reads out the readout unit block 304 of the memory 102*a* at the transfer source via the DMA controller 205 and the control unit 112 based on the packet transfer request for the packet "c". Subsequently, the third packet controller 202*c* writes the readout unit blocks 303 and 304 in the third packet buffer 203*c* and generates the packet "c" based on a part of data of the readout unit block 303 and a part of data of the readout unit block 304. Subsequently, the third packet controller 202*c* outputs a packet transmission request signal to the arbiter 206 via the selector 204*c*. When a permission signal is input to the third packet controller 202*c* from the arbiter 206, the third packet controller 202*c* outputs the packet "c" (including a write request) to the central processing unit 101*b* at the transfer destination via the arbiter 206 and the network 103. The packet receiver 207 of the central processing unit 101*b* writes a payload of the packet "c" as the write unit block 323 of the memory 102*b* at the transfer destination via the DMA controller 205 and the control unit 112.

Similarly, the fourth packet controller 202*d* reads out the readout unit block 304 of the memory 102*a* at the transfer source and thereafter reads out the readout unit block 305 of the memory 102*a* at the transfer source via the DMA controller 205 and the control unit 112 based on the packet transfer request for the packet "d". Subsequently, the fourth packet controller 202*d* writes the readout unit blocks 304 and 305 in the fourth packet buffer 203*d* and generates the packet "d" based on a part of data of the readout unit block 304 and a part of data of the readout unit block 305.

Subsequently, the fourth packet controller 202*d* outputs a packet transmission request signal to the arbiter 206 via the selector 204*d*. When a permission signal is input to the fourth packet controller 202*d* from the arbiter 206, the fourth packet controller 202*d* outputs the packet "d" (including a write request) to the central processing unit 101*b* at the transfer destination via the arbiter 206 and the network 103. The packet receiver 207 of the central processing unit 101*b* writes a payload of the packet "d" as the write unit block 324 of the memory 102*b* at the transfer destination via the DMA controller 205 and the control unit 112.

Similarly, the first packet controller 202*a* reads out the readout unit blocks 305 and 306 of the memory 102*a* at the transfer source based on the packet transfer request for the packet "e" and generates the packet "e". Subsequently, the first packet controller 202*a* outputs the packet "e" (including a write request) to the central processing unit 101*b* at the transfer destination. The packet receiver 207 of the central processing unit 101*b* writes a payload of the packet "e" as the write unit block 325 of the memory 102*b* at the transfer destination.

Similarly, the second packet controller 202*b* reads out the readout unit blocks 306 and 307 of the memory 102*a* at the transfer source based on the packet transfer request for the packet "f" and generates the packet "f". Subsequently, the second packet controller 202*b* outputs the packet "f" (including a write request) to the central processing unit 101*b* at the transfer destination. The packet receiver 207 of the central processing unit 101*b* writes a payload of the packet "f" as the write unit block 326 of the memory 102*b* at the transfer destination.

Similarly, the third packet controller 202*c* reads out the readout unit block 307 of the memory 102*a* at the transfer source based on the packet transfer request for the packet "g" and generates the packet "g". Subsequently, the third packet controller 202*c* outputs the packet "g" (including a write request) to the central processing unit 101*b* at the transfer destination. The packet receiver 207 of the central processing unit 101*b* writes a payload of the packet "g" as the write unit block 327 of the memory 102*b* at the transfer destination.

As explained above, the readout unit blocks 302 to 307 are respectively read out from the memory 102*a* at the transfer source twice. Therefore, a throughput of the memory 102*a* decreases and data transfer efficiency is deteriorated.

FIG. 4 is a diagram for explaining another data transfer method of the network controller 113 illustrated in FIG. 2. FIG. 4 is different from FIG. 3 in a payload length 412 of packets. The payload length 412 of the packets illustrated in FIG. 4 is different from the payload length 312 of the packets illustrated in FIG. 3. The payload length 412 of the packets is a maximum transferable payload length (MTU) and is, for example, 1792 bytes. As in the case illustrated in FIG. 3, the network controller 113 may transfer the payload 311 from the memory 102*a* at the transfer source to the memory 102*b* at the transfer destination. The number of packets may be reduced by increasing the payload length 412 of the packets. However, in this case as well, the readout unit blocks 302, 303, 306, and 307 are respectively read out from the memory 102*a* at the transfer source twice. Data transfer efficiency is deteriorated. The write unit blocks 322, 323, 324, and 327 are respectively written in the memory 102*b* at the transfer destination twice.

An example of deterioration in readout efficiency of the memory 102*a* at the transfer source is explained. For example, the payload 311 is 2 M bytes (2097152 bytes). The size of the respective readout unit blocks 301 to 307 is 256 bytes. The payload length (MTU) 412 of the packets is 1792 bytes. In this case, 2097152/1792=1170.3. Therefore, the payload 311 of 2097152 bytes is divided into 1171 packets of (1792 bytes×1170 packets+512 bytes×1 packet). The number of readout unit blocks read out twice is, for example, (the number of packets−1). The number of packets is 1171 packets. Therefore, memory accesses of 1171+1170 times are required. As a result, the payload 311 of 2097152 bytes is transferred. Therefore, 2396672 bytes (=2097152+1170× 256 bytes) are read out. As readout efficiency of the memory 102a, unnecessary data accounting for 14% of the total data is read out. A throughput of the memory accesses decreases.

Figure 5A:
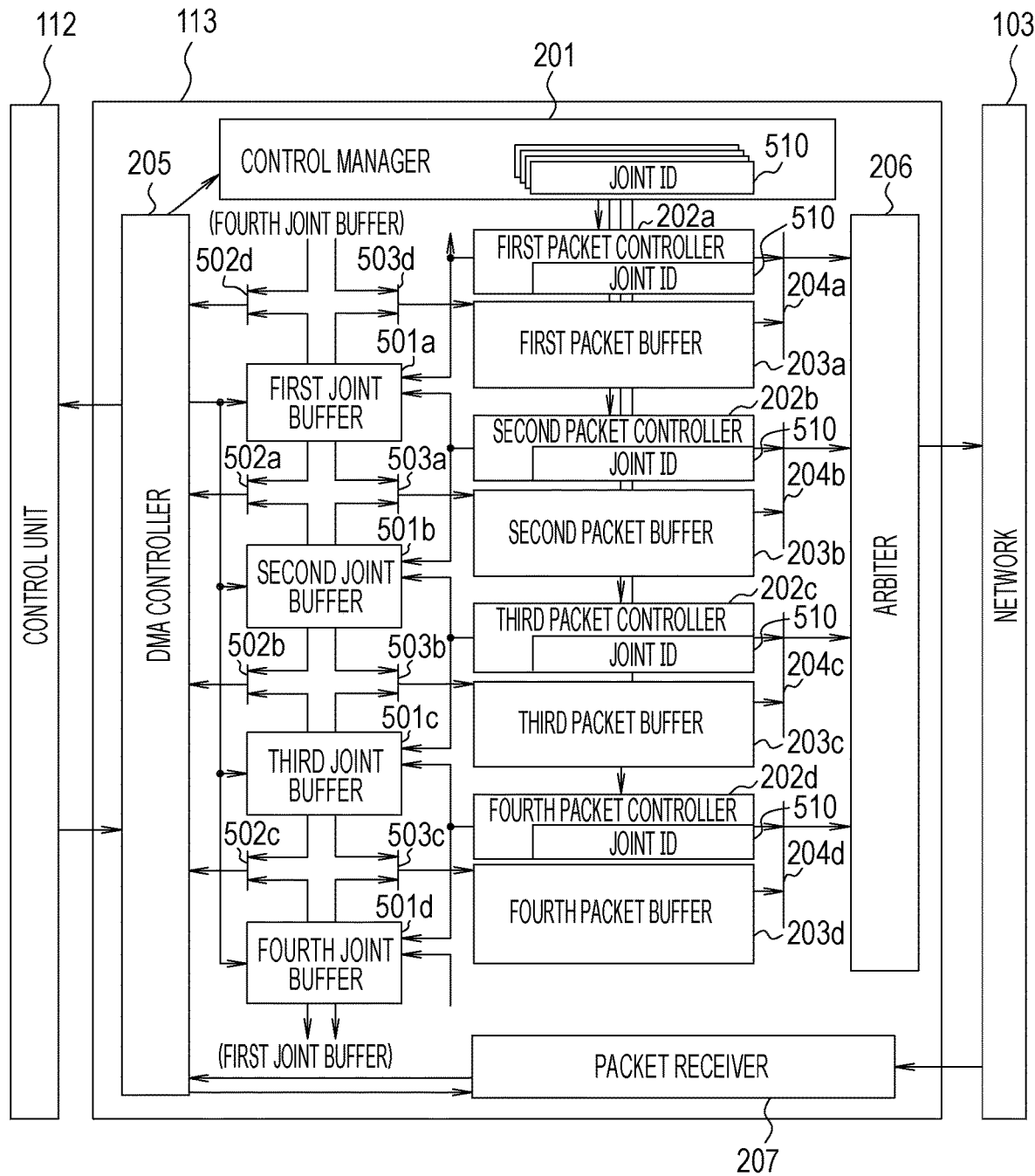
FIG. 5A is a diagram illustrating a configuration example of a network controller according to the embodiment.

FIG. 5A is a diagram illustrating a configuration example of the network controller 113 according to this embodiment. In the network controller 113 illustrated in FIG. 5A, a first joint buffer 501a, a second joint buffer 501b, a third joint buffer 501c, a fourth joint buffer 501d, selectors 502a to 502d, and selectors 503a to 503d are added to the network controller 113 illustrated in FIG. 2.

The selector 502a selectively outputs, to the DMA controller 205, readout requests output by the first and second joint buffers 501a and 501b. The selector 502b selectively outputs, to the DMA controller 205, readout requests output by the second and third joint buffers 501b and 501c. The selector 502c selectively outputs, to the DMA controller 205, readout requests output by the third and fourth joint buffers 501c and 501d. The selector 502d selectively outputs, to the DMA controller 205, readout requests output by the fourth and first joint buffers 501d and 501a.

The selector 503a selectively outputs, to the second packet buffer 203b, readout unit blocks output by the first and second joint buffers 501a and 501b. The selector 503b selectively outputs, to the third packet buffer 203c, readout unit blocks output by the second and third joint buffers 501b and 501c. The selector 503c selectively outputs, to the fourth packet buffer 203d, readout unit blocks output by the third and fourth joint buffers 501c and 501d. The selector 503d selectively outputs, to the first packet buffer 203a, readout unit blocks output by the fourth and first joint buffers 501d and 501a.

Figure 5B:
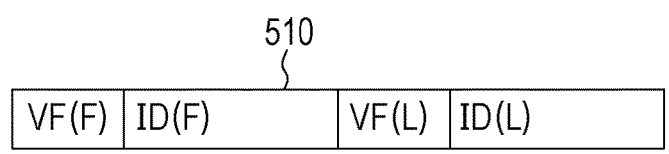
FIG. 5B is a diagram illustrating a configuration example of a joint ID.

FIG. 5B is a diagram illustrating a configuration example of a joint ID 510. The control manager 201 outputs the joint ID 510 corresponding to packets to the first to fourth packet controllers 202a to 202d. The joint ID 510 includes a head adjacency flag VF(F), a head identifier ID(F), an end adjacency flag VF(L), and an end identifier ID(L). The head adjacency flag VF(F) is head adjacency information. The end adjacency flag VF(L) is end adjacency information.

Figure 6A:
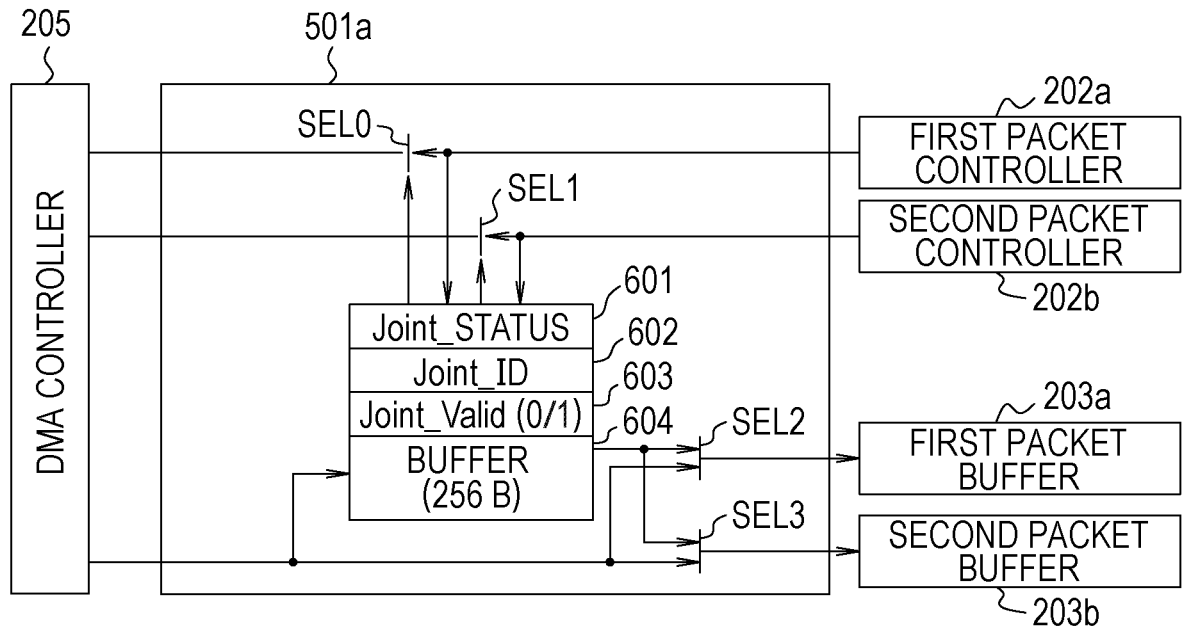
FIG. 6A is a diagram illustrating a configuration example of a first joint buffer.

FIG. 6A is a diagram illustrating a configuration example of the first joint buffer 501a. The second to fourth joint buffers 501b to 501d have the same configuration as the configuration of the first joint buffer 501a. The first joint buffer 501a includes selectors SEL0 to SEL3, storing units 601 to 603, and a buffer 604. The storing unit 601 stores a state Joint_STATUS of the first joint buffer 501a. The storing unit 602 stores an identifier Joint_ID. The storing unit 603 stores an adjacency flag (adjacency information) Joint_Valid (0/1). The buffer 604 has a capacity of, for example, 256 bytes and stores a readout unit block of the memory 102a.

The selector SEL0 outputs a readout request received from the first packet controller 202a to the DMA controller 205 according to a first control signal. The selector SEL1 outputs a readout request received from the second packet controller 202b to the DMA controller 205 according to a second control signal. The selector SEL2 outputs a readout unit block received from the DMA controller 205 or the buffer 604 to the first packet buffer 203a according to a third control signal. The selector SEL3 outputs a readout unit block received from the DMA controller 205 or the buffer 604 to the second packet buffer 203b according to a fourth control signal.

Figure 6B:
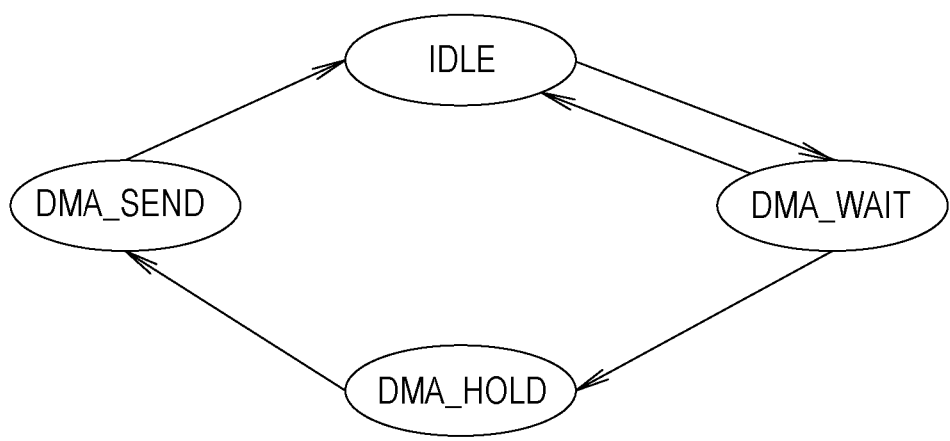
FIG. 6B is a state transition diagram.

FIG. 6B is a state transition diagram of the state Joint_STATUS illustrated in FIG. 6A. The state Joint_STATUS includes IDLE, DMA_WAIT, DMA_HOLD, and DMA_SEND. IDLE is an initial idle state. DMA_WAIT is a standby state for a response to a readout request to the memory 102a. DMA_HOLD is a state in which the buffer 604 retains a readout unit block. DMA_SEND is a state in which the readout unit block retained in the buffer 604 may be transmitted.

FIG. 7 is a diagram for explaining a data transfer method of the network controller 113 according to this embodiment. Differences of FIG. 7 from FIG. 3 are explained below. The control manager 201 is a dividing unit. The control manager 201 analyzes a data transfer request and divides the data transfer request into seven packet transfer requests for the packets "a" to "g" in packet units. The payload lengths 312 of the respective packets "a" to "g" are respectively the same as the length of the write unit block 321 of the memory 102b at the transfer destination. The payload 311 is divided in payload length 312 units.

When a readout end address based on the packet transfer request for the packet "a" is adjacent to a readout head address based on the packet transfer request for the next packet "b" in the readout unit block 302 of the memory 102a, the control manager 201 sets an end adjacency flag VF(L) and a first identifier ID(L) in the packet transfer request for the packet "a" and sets a head adjacency flag VF(F) and a first identifier ID(F) in the packet transfer request for the packet "b".

Similarly, when a readout end address based on the packet transfer request for the packet "b" is adjacent to a readout head address based on the packet transfer request for the next packet "c" in the readout unit block 303 of the memory 102a, the control manager 201 sets the end adjacency flag VF(L) and a second identifier ID(L) in the packet transfer request for the packet "b" and sets the head adjacency flag VF(F) and a second identifier ID(F) in the packet transfer request for the packet "c". The same applies to the other packets.

In the packet transfer request for the packet "a", the head adjacency flag VF(F) is not set and the end adjacency flag VF(L) is set. In the packet transfer requests for the packets "b" to "f", the head adjacency flag VF(F) and the end adjacency flag VF(L) are set. In the packet transfer request for the packet "g", the head adjacency flag VF(F) is set and the end adjacency flag VF(L) is not set.

The control manager 201 outputs the packet transfer request for the packet "a" to the first packet controller 202a, outputs the packet transfer request for the packet "b" to the second packet controller 202b, outputs the packet transfer request for the packet "c" to the third packet controller 202c, and outputs the packet transfer request for the packet "d" to the fourth packet controller 202d. The control manager 201 outputs the packet transfer request for the packet "e" to the first packet controller 202a, outputs the packet transfer request for the packet "f" to the second packet controller 202b, and outputs the packet transfer request for the packet "g" to the third packet controller 202c.

When the head adjacency flag VF(F) is not set in the packet transfer request for the packet "a", the first packet controller 202a does not set the head adjacency flag VF(F)

for a first readout request for the readout unit block 301 of the memory 102a including a readout head address based on the packet transfer request for the packet "a" and outputs a readout request. The DMA controller 205 reads out the readout unit block 301 including a head address from the memory 102a via the control unit 112 in response to the readout request and outputs the readout unit block 301 to the first packet buffer 203a.

Subsequently, when the end adjacency flag VF(L) and the first identifier ID(L) are set in the packet transfer request for the packet "a", the first packet controller 202a sets the end adjacency flag VF(L) and the first identifier ID(L) in the readout request for the readout unit block 302 of the memory 102a including the readout end address based on the packet transfer request for the packet "a" and outputs the readout request, in which the end adjacency flag VF(L) and the first identifier ID(L) are set, to the first joint buffer 501a.

When the readout request is input to the first joint buffer 501a and the end adjacency flag VF(L) and the first identifier ID(L) are set in the readout request, the first joint buffer 501a registers 1 in the storing unit 603 as an adjacency flag Joint_Valid(0), registers the first identifier ID(L) in the storing unit 602 as the identifier Joint_ID, and outputs the readout request to the DMA controller 205. The DMA controller 205 reads out the readout unit block 302 including an end address from the memory 102a via the control unit 112 in response to the readout request and outputs the readout unit block 302 including the end address to the first joint buffer 501a. The first joint buffer 501a retains the readout unit block 302 including the end address in the buffer 604 and outputs the readout unit block 302 to the first packet buffer 203a.

The first packet controller 202a generates the packet "a" based on a part of the readout unit block 301 including the head address and a part of the readout unit block 302 including the end address in the first packet buffer 203a and outputs the packet "a" to the memory 102b of the central processing unit 101b. The central processing unit 101b writes a payload of the packet "a" as the write unit block 321 of the memory 102b.

Subsequently, when the head adjacency flag VF(F) and the second identifier ID(F) are set in the packet transfer request for the packet "b", the second packet controller 202b sets the head adjacency flag VF(F) and the first identifier ID(F) in the readout request for the readout unit block 302 of the memory 102a including the readout head address based on the packet transfer request for the packet "b" and outputs the readout request, in which the head adjacency flag VF(F) and the first identifier ID(F) are set, to the first joint buffer 501a.

When the readout request is input to the first joint buffer 501a, the head adjacency flag VF(F) and the first identifier ID(F) are set in the readout request, 1 is registered in the adjacency flag Joint_Valid(0) in the storing unit 603, and the input first identifier ID(F) coincides with the identifier Joint_ID in the storing unit 602, the first joint buffer 501a outputs the readout unit block 302 retained in the buffer 604 to the second packet buffer 203b. At this time, the first joint buffer 501a does not output the input readout request to the DMA controller 205. Consequently, the readout unit block 302 is read out from the memory 102a only once.

Subsequently, when the end adjacency flag VF(L) and the second identifier ID(L) are set in the packet transfer request for the packet "b", the second packet controller 202b sets the end adjacency flag VF(L) and the second identifier ID(L) in a readout request for the readout unit block 303 of the memory 102a including the readout end address based on the packet transfer request for the packet "b" and outputs the readout request, in which the end adjacency flag VF(L) and the second identifier ID(L) are set, to the second joint buffer 501b.

When the readout request is input the second joint buffer 501b and the end adjacency flag VF(L) and the second identifier ID(L) are set in the readout request, the second joint buffer 501b registers 1 in the storing unit 603 as the adjacency flag Joint_Valid(0), registers the second identifier ID(L) in the storing unit 602 as the identifier Joint_ID, and outputs the readout request to the DMA controller 205. The DMA controller 205 reads out the readout unit block 303 including an end address from the memory 102a via the control unit 112 in response to the readout request and outputs the readout unit block 303 including the end address to the second joint buffer 501b. The second joint buffer 501b retains the readout unit block 303 including the end address in the buffer 604 and outputs the readout unit block 303 including the end address to the second packet buffer 203b.

The second packet controller 202b generates the packet "b" based on a part of the readout unit block 302 including a head address and a part of the readout unit block 303 including the end address in the second packet buffer 203b and outputs the packet "b" to the memory 102b of the central processing unit 101b at the transfer destination. The central processing unit 101b writes a payload of the packet "b" as the write unit block 322 of the memory 102b.

Subsequently, when the head adjacency flag VF(F) and the second identifier ID(F) are set in the packet transfer request for the packet "c", the third packet controller 202c sets the head adjacency flag VF(F) and the second identifier ID(F) in a readout request for the readout unit block 303 of the memory 102a including a readout head address based on the packet transfer request for the packet "c" and outputs the readout request, in which the head adjacency flag VF(F) and the second identifier ID(F) are set, to the second joint buffer 501b.

When the readout request is input to the second joint buffer 501b, the head adjacency flag VF(F) and the second identifier ID(F) are set in the readout request, 1 is registered in the adjacency flag Joint_Valid(0) in the storing unit 603, and the input second identifier ID(F) coincides with the identifier Joint_ID in the storing unit 602, the second joint buffer 501b outputs the readout unit block 303 retained in the buffer 604 to the third packet buffer 203c. At this time, the second joint buffer 501b does not output the input readout request to the DMA controller 205. Consequently, the readout unit block 303 is read out from the memory 102a only once. The same applies to the other packets.

As explained above, the readout unit block 302 is read out from the memory 102a at the transfer source only once and retained in the first joint buffer 501a. The first joint buffer 501a outputs the readout unit block 302 to the first and second packet buffers 203a and 203b.

The readout unit block 303 is read out from the memory 102a at the transfer source only once and retained in the second joint buffer 501b. The second joint buffer 501b outputs the readout unit block 303 to the second and third packet buffers 203b and 203c.

The readout unit block 304 is read out from the memory 102a at the transfer source only once and retained in the third joint buffer 501c. The third joint buffer 501c outputs the readout unit block 304 to the third and fourth packet buffers 203c and 203d.

The readout unit block 305 is read out from the memory 102a at the transfer source only once and retained in the fourth joint buffer 501d. The fourth joint buffer 501d outputs the readout unit block 305 to the fourth and first packet buffers 203d and 203a.

The readout unit block 306 is read out from the memory 102a at the transfer source only once and retained in the first joint buffer 501a. The first joint buffer 501a outputs the readout unit block 306 to the first and second packet buffers 203a and 203b.

The readout unit block 307 is read out from the memory 102a at the transfer source only once and retained in the second joint buffer 501b. The second joint buffer 501b outputs the readout unit block 307 to the second and third packet buffers 203b and 203c.

As explained above, the readout unit blocks 301 to 307 are respectively read out from the memory 102a at the transfer source once. Therefore, the throughput of the memory 102a is increased and the data transfer efficiency is improved.

Figure 8:
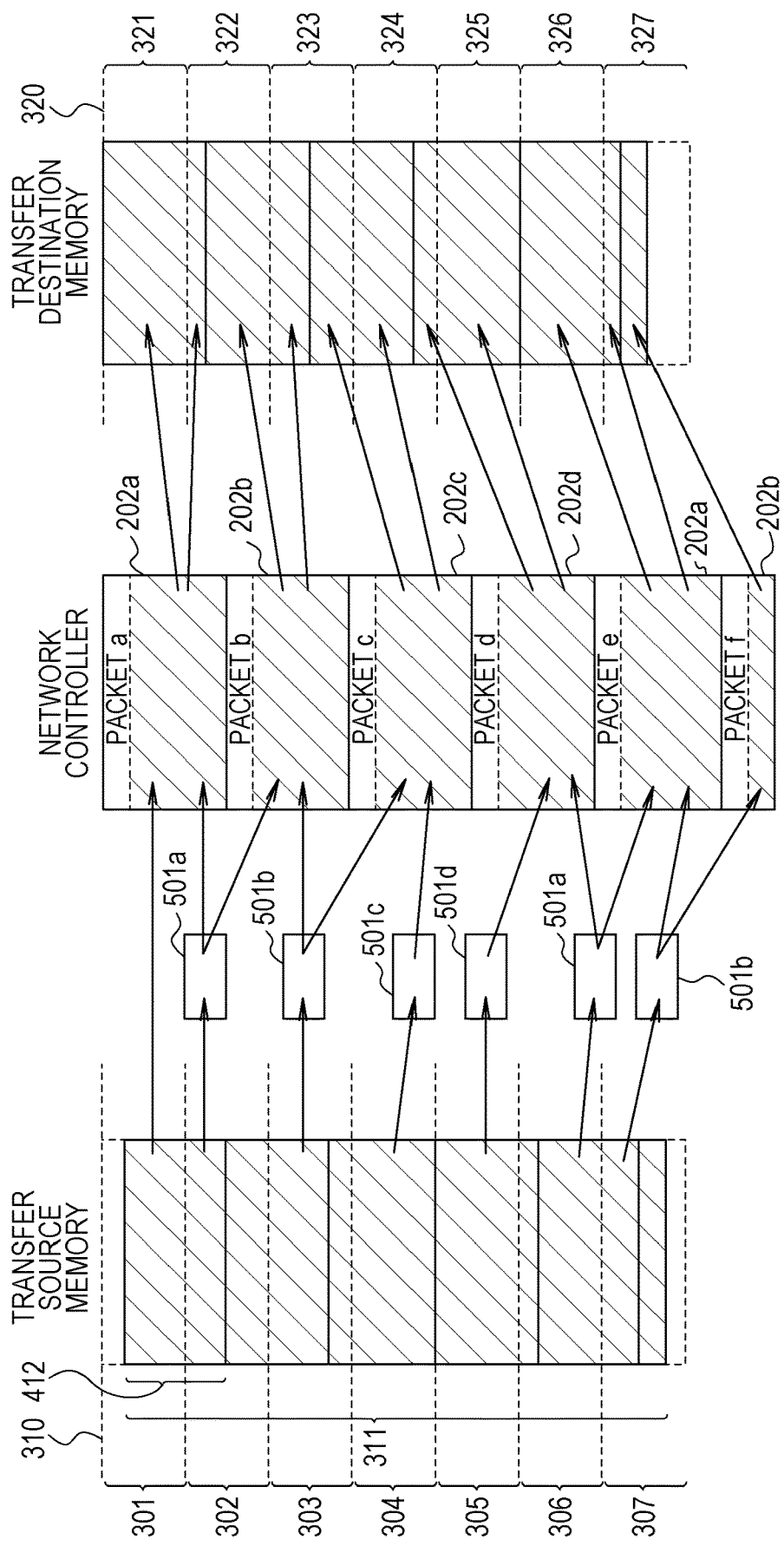
FIG. 8 is a diagram for explaining another data transfer method of the network controller according to the embodiment.

FIG. 8 is a diagram for explaining another data transfer method of the network controller 113 according to this embodiment. FIG. 8 is different from FIG. 7 in the payload length 412 of packets. The payload length 412 of the packets illustrated in FIG. 8 is different from the payload length 312 of the packets illustrated in FIG. 7. The payload length 412 of the packets is a maximum transferable payload length (MTU) and is, for example, 1792 bytes. As in the case of FIG. 7, the network controller 113 may transfer the payload 311 from the memory 102a at the transfer source to the memory 102b at the transfer destination. By increasing the payload length 412 of the packets, the number of packets may be reduced. In this case as well, the readout unit blocks 301 to 307 are respectively read out from the memory 102a at the transfer source once. Therefore, the throughput of the memory 102a is increased and the data transfer efficiency is improved.

An example of improvement of the readout efficiency of the memory 102a at the transfer source is explained. For example, the payload 311 is 2 M bytes (2097152 bytes). In FIG. 8, 2 M bytes are read out from the memory 102a to transfer the payload 311 of 2 M bytes. The readout efficiency of the memory 102a illustrated in FIG. 8 is improved by 14% compared with the case illustrated in FIG. 4.

Figure 9:
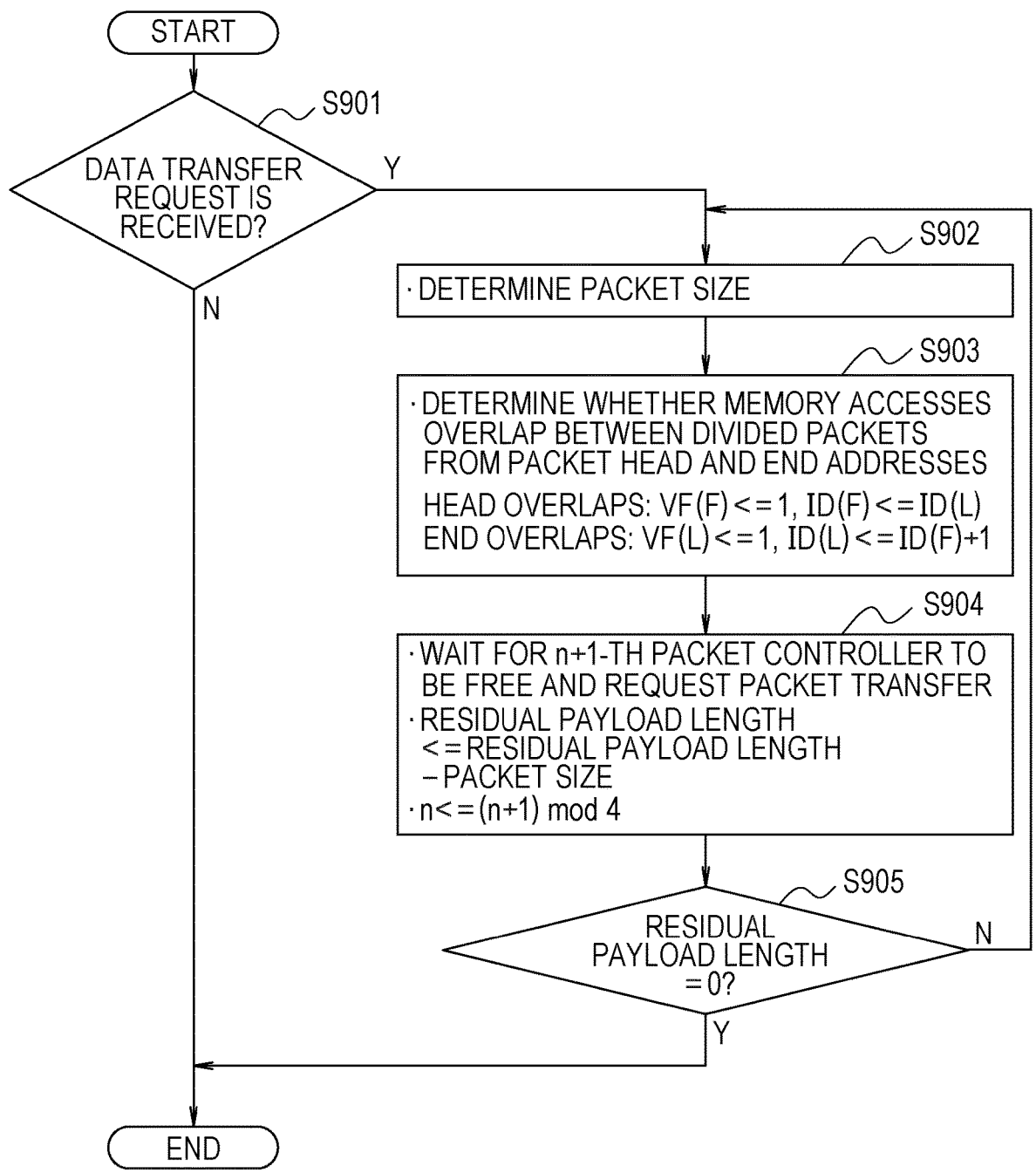
FIG. 9 is a flowchart illustrating a processing example of a control manager.

FIG. 9 is a flowchart illustrating a processing example of the control manager 201. The processing example illustrated in FIG. 9 is explained below. In step S901, the control manager 201 checks whether a data transfer request (a payload transmission request) is received (input). When the data transfer request is received, the control manager 201 proceeds to step S902. When the data transfer request is not received, the control manager 201 ends the processing.

In step S902, the control manager 201 determines a size of the packet "a". Subsequently, in step S903, the control manager 201 sets 0 in the head adjacency flag VF(F) and sets 0 in the head identifier ID(F) in response to the packet transfer request for the packet "a" because the packet "a" is a head packet. When a readout end address based on the packet transfer request of the packet "a" is adjacent to the readout head address based on the packet transfer request for the packet "b" in the readout unit block 302 of the memory 102a, the control manager 201 sets 1 in the end adjacency flag VF(L) and sets 1 in the identifier ID(L) in response to the packet transfer request for the packet "a".

Subsequently, in step S904, the control manager 201 waits for a buffer in an n+1-th packet controller to be free and outputs the packet transfer request for the packet "a" to the n+1-th packet controller. An initial value of n is 0. Therefore, the control manager 201 waits for a buffer in the first packet controller 202a to be free and outputs the packet transfer request for the packet "a" to the first packet controller 202a. The control manager 201 subtracts the size of the packet "a" from the residual payload length. An initial value of the residual payload length is a total packet size. The control manager 201 sets a remainder obtained by dividing n+1 by 4 as new n. For example, n is 1.

Subsequently, when the residual payload length is not 0 in step S905, the control manager 201 returns to step S902 and repeats processing of the next packet.

Subsequently, in step S902, the control manager 201 determines a size of the packet "b". Subsequently, in step S903, when the readout head address based on the packet transfer request for the packet "b" is adjacent to the readout end address based on the packet transfer request for the packet "a" in the readout unit block 302 of the memory 102a, the control manager 201 sets 1 in the head adjacency flag VF(F) and sets 1 in the identifier ID(F) in response to the packet transfer request for the packet "b". When the readout end address based on the packet transfer request for the packet "b" is adjacent to a readout head address based on the packet transfer request for the packet "c" in the readout unit block 303 of the memory 102a, the control manager 201 sets 1 in the end adjacency flag VF(L) and sets 2 in the identifier ID(L) in response to the packet transfer request for the packet "b".

Subsequently, in step S904, the control manager 201 waits for a buffer in the second packet controller 202b to be free and outputs the packet transfer request for the packet "b" to the second packet controller 202b. The control manager 201 subtracts the size of the packet "b" from the residual payload length. The control manager 201 updates n to 2. Thereafter, the control manager 201 returns to step S902.

Subsequently, in step S902, the control manager 201 determines a size of the packet "c". Subsequently, in step S903, when the readout head address based on the packet transfer request for the packet "c" is adjacent to the readout end address based on the packet transfer request for the packet "b" in the readout unit block 303 of the memory 102a, the control manager 201 sets 1 in the head adjacency flag VF(F) and sets 2 in the identifier ID(F) in response to the packet transfer request for the packet "c". When a readout end address based on the packet transfer request for the packet "c" is adjacent to a readout head address based on the packet transfer request for the packet "d" in the readout unit block 304 of the memory 102a, the control manager 201 sets 1 in the end adjacency flag VF(L) and sets 3 in the identifier ID(L) in response to the packet transfer request for the packet "c".

Subsequently, in step S904, the control manager 201 waits for a buffer in the third packet controller 202c to be free and outputs the packet transfer request for the packet "c" to the third packet controller 202c. The control manager 201 subtracts the size of the packet "c" from the residual payload length. The control manager 201 updates n to 3.

The control manager 201 performs the processing explained above on all the packets. In step S905, when the residual payload length is 0, the control manager 201 ends the processing.

Figure 10:
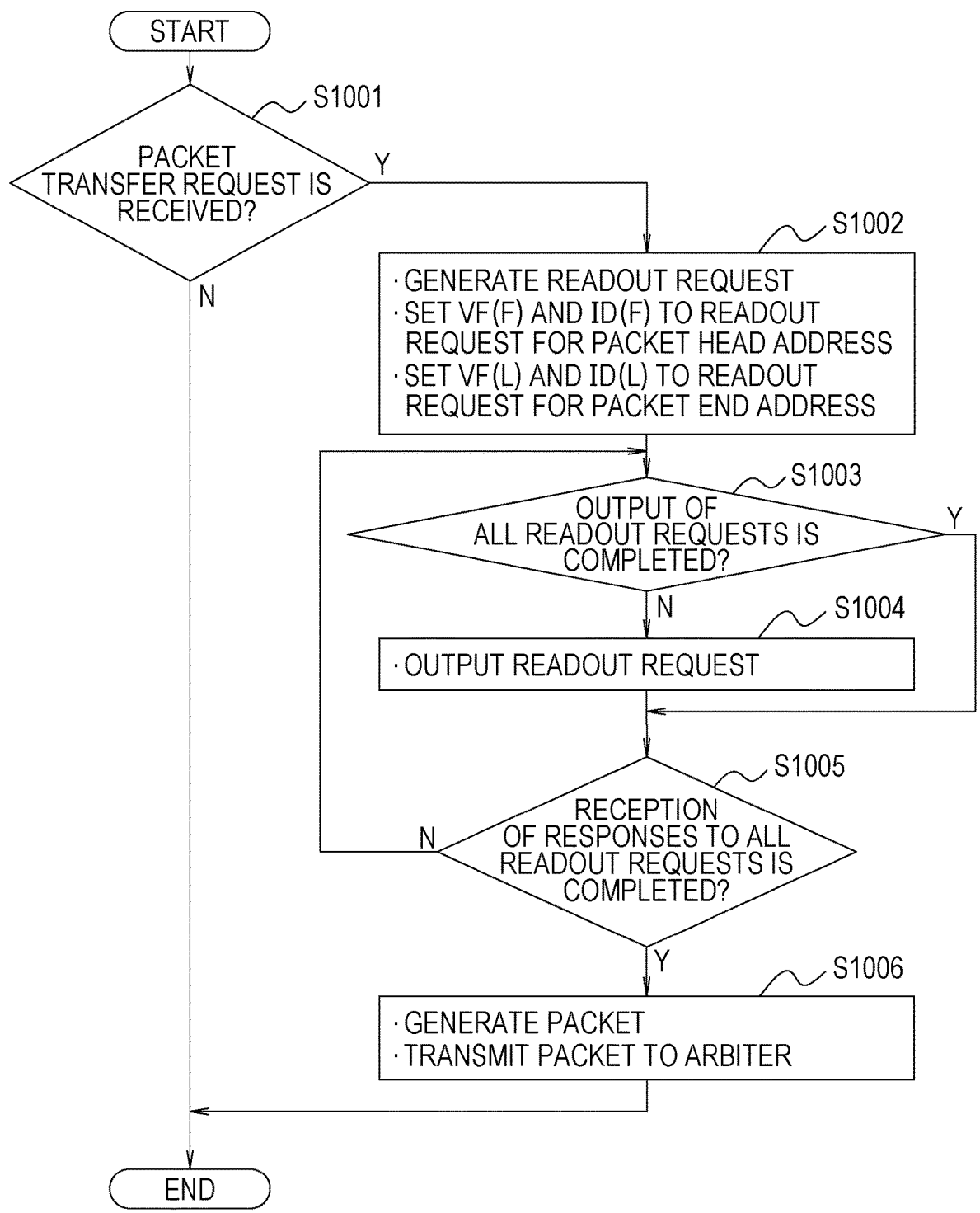
FIG. 10 is a flowchart illustrating a processing example of a first packet controller.

FIG. 10 is a flowchart illustrating a processing example of the first packet controller 202a. The second to fourth packet controllers 202b to 202d are the same as the first packet controller 202a.

When the first packet controller 202a receives a packet transfer request (a packet generation request) in step S1001, the first packet controller 202a proceeds to step S1002.

When the first packet controller 202a does not receive the packet transfer request, the first packet controller 202a ends the processing.

In step S1002, the first packet controller 202a generates a readout request for the readout unit block 301 of the memory 102a including a readout head address of the packet "a" and a readout request for the readout unit block 302 of the memory 102a including a readout end address of the packet "a". When the head adjacency flag VF(F) of 0 is set in the packet transfer request for the packet "a", the first packet controller 202a sets the head adjacency flag VF(F) of 0 in response to the readout request for the readout unit block 301 including the readout head address based on the packet transfer request for the packet "a".

When the end adjacency flag VF(L) of 1 and the end identifier ID(L) of 1 are set in the packet transfer request for the packet "a", the first packet controller 202a sets the end adjacency flag VF(L) of 1 and the end identifier ID(L) of 1 in the readout request for the readout unit block 302 including the readout end address based on the packet transfer request for the packet "a".

The second packet controller 202b generates a readout request for the readout unit block 302 of the memory 102a including a readout head address of the packet "b" and a readout request for the readout unit block 303 of the memory 102a including a readout end address of the packet "b". When the head adjacency flag VF(F) of 1 and the head identifier ID(F) of 1 are set in the packet transfer request for the packet "b", the second packet controller 202b sets the head adjacency flag VF(F) of 1 and the head identifier ID(F) of 1 in response to the readout request for the readout unit block 302 including the readout head address based on the packet transfer request for the packet "b".

When the end adjacency flag VF(L) of 1 and the end identifier ID(L) of 2 are set in the packet transfer request for the packet "b", the second packet controller 202b sets the end adjacency flag VF(L) of 1 and the end identifier ID(L) of 2 in response to the readout request for the readout unit block 303 including the readout end address based on the packet transfer request for the packet "b". The same applies to the third and fourth packet controllers 202c and 202d.

Subsequently, when the output of all the readout requests is not completed in step S1003, the first packet controller 202a proceeds to step S1004. When the output of all the readout requests is completed, the first packet controller 202a proceeds to step S1005.

In step S1004, the first packet controller 202a outputs the readout request for the readout unit block 301 to the fourth joint buffer 501d and outputs the readout request for the readout unit block 302 to the first joint buffer 501a. The second packet controller 202b outputs the readout request for the readout unit block 302 to the first joint buffer 501a and outputs the readout request for the readout unit block 303 to the second joint buffer 501b. The same applies to the third and fourth packet controllers 202c and 202d.

Subsequently, when responses to all the readout requests (the readout unit blocks 301 and 302) are not received in step S1005, the first packet controller 202a returns to step S1003. When responses to all the readout requests are received, the first packet controller 202a proceeds to step S1006. The same applies to the second to fourth packet controllers 202b to 202d.

In step S1006, the first packet controller 202a generates the packet "a" of a payload including a part of the readout unit block 301 and a part of the readout unit block 302 read out in response to the readout request. The first packet controller 202a transmits the packet "a" to the memory 102b of the central processing unit 101b at the transfer destination via the arbiter 206 and the network 103.

The second packet controller 202b generates the packet "b" of a payload including a part of the readout unit block 302 and a part of the readout unit block 303 read out in response to the readout request. The second packet controller 202b transmits the packet "b" to the memory 102b of the central processing unit 101b at the transfer destination via the arbiter 206 and the network 103. The same applies to the third and fourth packet controllers 202c and 202d.

Figure 11:
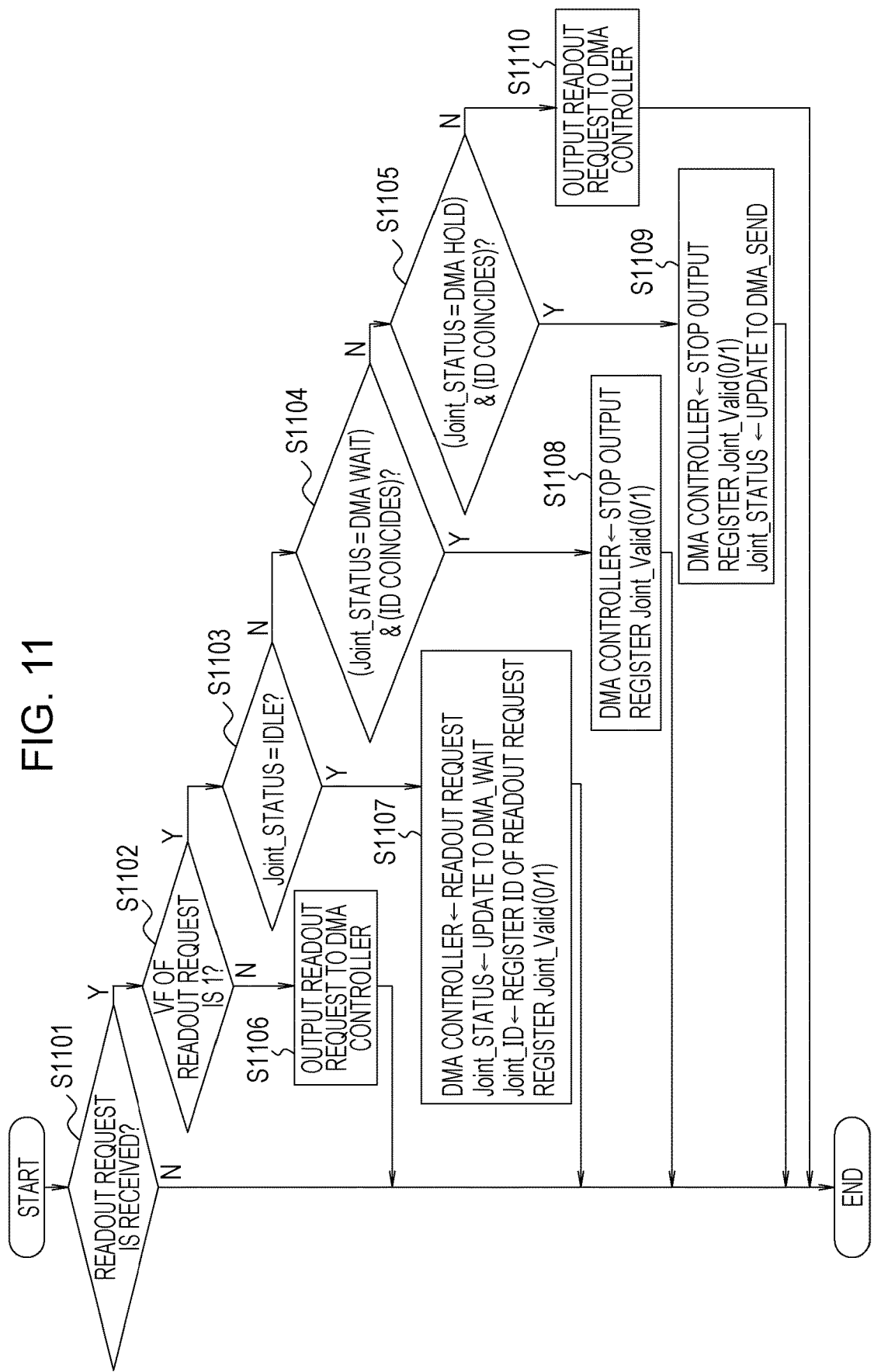
FIG. 11 is a flowchart illustrating readout request reception processing of the first joint buffer.

FIG. 11 is a flowchart illustrating readout request reception processing of the first joint buffer 501a. Processing of the second to fourth joint buffers 501b to 501d is the same as the processing of the first joint buffer 501a.

When the first joint buffer 501a receives a readout request from the first or second packet controller 202a or 202b in step S1101, the first joint buffer 501a proceeds to step S1002. When the first joint buffer 501a does not receive the readout request, the first joint buffer 501a ends the processing.

In step S1102, the first joint buffer 501a determines whether the end adjacency flag VF(L) of the readout request from the first packet controller 202a or the head adjacency flag VF(F) of the readout request from the second packet controller 202b is 1. When the adjacency flag VF(L) or VF(F) is 1, the first joint buffer 501a proceeds to step S1103. When the adjacency flag VF(L) or VF(F) is not 1, the first joint buffer 501a proceeds to step S1106.

In step S1106, when the first joint buffer 501a receives the readout request from the first packet controller 202a, the selector SEL0 outputs the readout request received from the first packet controller 202a to the memory 102a via the DMA controller 205 and the control unit 112.

When the first joint buffer 501a receives the readout request from the second packet controller 202b, the selector SEL1 outputs the readout request received from the second packet controller 202b to the memory 102a via the DMA controller 205 and the control unit 112. For example, the selector SEL1 of the fourth joint buffer 501d outputs the readout request for the readout unit block 301 received from the first packet controller 202a to the memory 102a via the DMA controller 205 and the control unit 112.

In step S1003, the first joint buffer 501a determines whether the state Joint_STATUS stored in the storing unit 601 is IDLE. An initial value of the state Joint_STATUS is IDLE. When the state Joint_STATUS is IDLE, the first joint buffer 501a proceeds to step S1107. When the state Joint_STATUS is not IDLE, the first joint buffer 501a proceeds to step S1104.

In step S1107, the selector SEL0 outputs the readout request for the readout unit block 302 received from the first packet controller 202a to the memory 102a via the DMA controller 205 and the control unit 112. The first joint buffer 501a updates the state Joint_STATUS stored in the storing unit 601 to DMA_WAIT. The first joint buffer 501a registers the end identifier ID(L) set in the readout request for the readout unit block 302 received from the first packet controller 202a in the storing unit 602 as the identifier Joint_ID. The first joint buffer 501a registers 1 in the storing unit 603 as the adjacency flag Joint_Valid(0). Consequently, the first joint buffer 501a changes to a standby state for a response (the readout unit block 302) to the readout request.

In step S1104, the first joint buffer 501a determines whether a condition that the state Joint_STATUS in the storing unit 601 is DMA_WAIT and the identifier Joint_ID in the storing unit 602 coincides with the head adjacency flag VF(F) of the received readout request is satisfied. When the condition is satisfied, the first joint buffer 501*a* proceeds to step S1108. When the condition is not satisfied, the first joint buffer 501*a* proceeds to step S1105.

In step S1108, the first joint buffer 501*a* does not output the received readout request to the DMA controller 205. For example, in the first joint buffer 501*a*, the selector SEL1 does not output the readout request for the readout unit block 302 received from the second packet controller 202*b* to the DMA controller 205. The first joint buffer 501*a* registers 1 in the storing unit 603 as an adjacency flag Joint_Valid(1). Consequently, the first joint buffer 501*a* maintains the standby state of the response (the readout unit block 302) to the readout request.

In step S1105, the first joint buffer 501*a* determines whether a condition that the state Joint_STATUS in the storing unit 601 is DMA_HOLD and the identifier Joint_ID in the storing unit 602 coincides with the identifier ID(F) of the readout request is satisfied. When the condition is satisfied, the first joint buffer 501*a* proceeds to step S1109. When the condition is not satisfied, the first joint buffer 501*a* proceeds to step S1110.

In step S1109, the first joint buffer 501*a* does not output the received readout request to the DMA controller 205. For example, in the first joint buffer 501*a*, the selector SEL1 does not output the readout request for the readout unit block 302 received from the second packet controller 202*b* to the DMA controller 205. The first joint buffer 501*a* registers 1 in the storing unit 603 as the adjacency flag Joint_Valid(1). The first joint buffer 501*a* updates the state Joint_STATUS stored in the storing unit 601 to DMA_SEND. Consequently, the first joint buffer 501*a* changes to a state in which the readout unit block 302 retained in the buffer 604 may be transmitted to the second packet buffer 203*b*.

In step S1110, when the first joint buffer 501*a* receives a readout request from the first packet controller 202*a*, the selector SEL0 outputs the readout request received from the first packet controller 202*a* to the memory 102*a* via the DMA controller 205 and the control unit 112.

When the first joint buffer 501*a* receives a readout request from the second packet controller 202*b*, the selector SEL1 outputs the readout request received from the second packet controller 202*b* to the memory 102*a* via the DMA controller 205 and the control unit 112.

For example, the first joint buffer 501*a* is in a state in which the first joint buffer 501*a* has received the readout request for the readout unit block 306 but processing of the readout unit block 302 before the readout of the readout unit block 306 has not ended. In that case, the first joint buffer 501*a* is unable to retain the readout unit block 306. Therefore, the first joint buffer 501*a* outputs the received readout request to the DMA controller 205.

Figure 12:
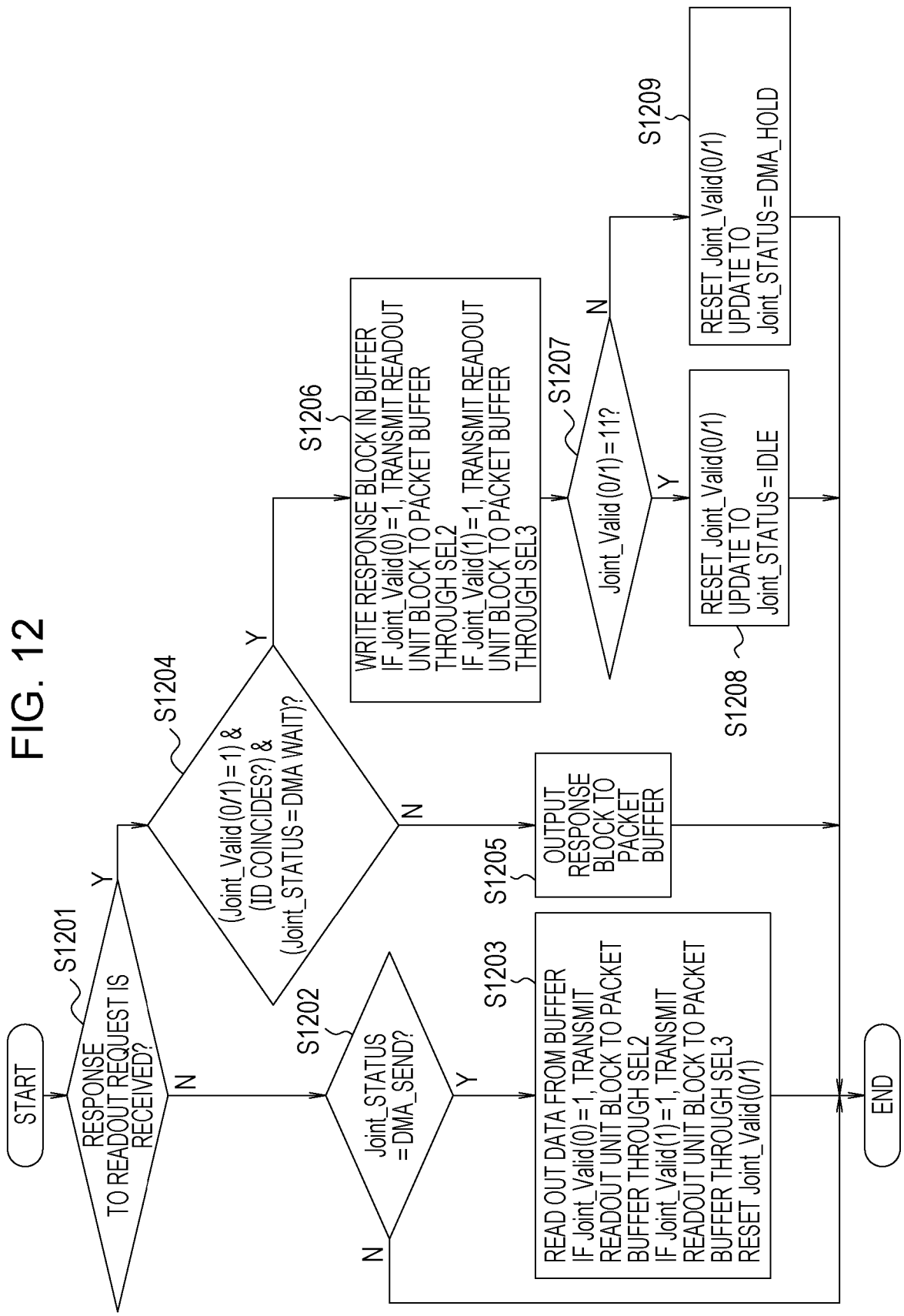
FIG. 12 is a flowchart illustrating response reception processing for a readout request of the first joint buffer.

FIG. 12 is a flowchart illustrating response reception processing for a readout request of the first joint buffer 501*a*. Processing of the second to fourth joint buffers 501*b* to 501*d* is the same as the processing of the first joint buffer 501*a*.

In step S1201, the first joint buffer 501*a* determines whether a readout unit block read out in response to a readout request is received from the memory 102*a* via the DMA controller 205 and the control unit 112. When the readout unit block is received, the first joint buffer 501*a* proceeds to step S1204. When the readout unit block is not received, the first joint buffer 501*a* proceeds to step S1202.

When the state Joint_STATUS in the storing unit 601 is DMA_SEND in step S1202, the first joint buffer 501*a* proceeds to step S1203. When the state Joint_STATUS is not DMA_SEND, the first joint buffer 501*a* ends the processing.

In step S1203, the first joint buffer 501*a* reads out a readout unit block retained in the buffer 604. When the adjacency flag Joint_Valid(0) is 1, the selector SEL2 outputs the readout unit block read out from the buffer 604 to the first packet buffer 203*a*. When the adjacency flag Joint_Valid(1) is 1, the selector SEL3 outputs the readout unit block read out from the buffer 604 to the second packet buffer 203*b*. For example, the selector SEL3 outputs the readout unit block 302 read out from the buffer 604 to the second packet buffer 203*b*. The first joint buffer 501*a* resets the adjacency flags Joint_Valid(0) and Joint_Valid(1) to 0 and updates the state Joint_STATUS to IDLE.

In step S1204, the first joint buffer 501*a* determines whether a condition that the adjacency flag Joint_Valid(0) or Joint_Valid(1) in the storing unit 603 is 1, the identifier Joint_ID in the storing unit 602 coincides with the identifier ID(F) or ID(L) of the received readout request, and the state Joint_STATUS is DMA_WAIT is satisfied. When the condition is satisfied, the first joint buffer 501*a* proceeds to step S1206. When the condition is not satisfied, the first joint buffer 501*a* proceeds to step S1205.

In step S1205, when the first joint buffer 501*a* receives a readout request from the first packet controller 202*a*, the selector SEL2 outputs the readout unit block read out from the memory 102*a* via the DMA controller 205 and the control unit 112 to the first packet buffer 203*a*.

When the first joint buffer 501*a* receives a readout request from the second packet controller 202*b*, the selector SEL3 outputs the readout unit block read out from the memory 102*a* via the DMA controller 205 and the control unit 112 to the second packet buffer 203*b*.

In step S1206, the first joint buffer 501*a* writes, in the buffer 604, the readout unit block read out from the memory 102*a* via the DMA controller 205 and the control unit 112.

When the adjacency flag Joint_Valid(0) in the storing unit 603 is 1, the selector SEL2 outputs the readout unit block read out from the memory 102*a* via the DMA controller 205 and the control unit 112 to the first packet buffer 203*a*.

When the adjacency flag Joint_Valid(1) in the storing unit 603 is 1, the selector SEL3 outputs the readout unit block read out from the memory 102*a* via the DMA controller 205 and the control unit 112 to the second packet buffer 203*b*.

Subsequently, in step S1207, the first joint buffer 501*a* determines whether both of the adjacency flags Joint_Valid (0) and Joint_Valid(1) in the storing unit 603 are 1. When both of the adjacency flags Joint_Valid(0) and Joint_Valid(1) are 1, the first joint buffer 501*a* proceeds to step S1208. When both of the adjacency flags Joint_Valid(0) and Joint_Valid(1) are not 1, the first joint buffer 501*a* proceeds to step S1209.

In step S1208, the first joint buffer 501*a* resets the adjacency flags Joint_Valid(0) and Joint_Valid(1) in the storing unit 603 to 0. The first joint buffer 501*a* updates the state Joint_STATUS in the storing unit 601 to IDLE. For example, the first joint buffer 501*a* is in a state in which the first joint buffer 501*a* has received a readout request for the readout unit block 302 from the first packet controller 202*a*, has received a readout request for the readout unit block 302 from the second packet controller 202*b*, and thereafter has received the readout unit block 302 from the DMA controller 205. In this case, in step S1206, the first joint buffer 501*a* outputs the readout unit block 302 received from the DMA controller 205 to the first and second packet buffers 203*a* and 203*b*. Details of this processing are explained below with reference to FIG. 14.

In step S1209, the first joint buffer 501*a* resets the adjacency flags Joint_Valid(0) and Joint_Valid(1) in the storing unit 603 to 0. The first joint buffer 501a updates the state Joint_STATUS in the storing unit 601 to DMA_HOLD. For example, the first joint buffer 501a is in a state in which the first joint buffer 501a has received a readout request for the readout unit block 302 from the first packet controller 202a and thereafter has received the readout unit block 302 from the DMA controller 205. In this case, in step S1206, the first joint buffer 501a writes the readout unit block 302 received from the DMA controller 205 in the buffer 604 and outputs the readout unit block 302 to the first packet buffer 203a. Details of this processing are explained below with reference to FIG. 13.

Figure 13:
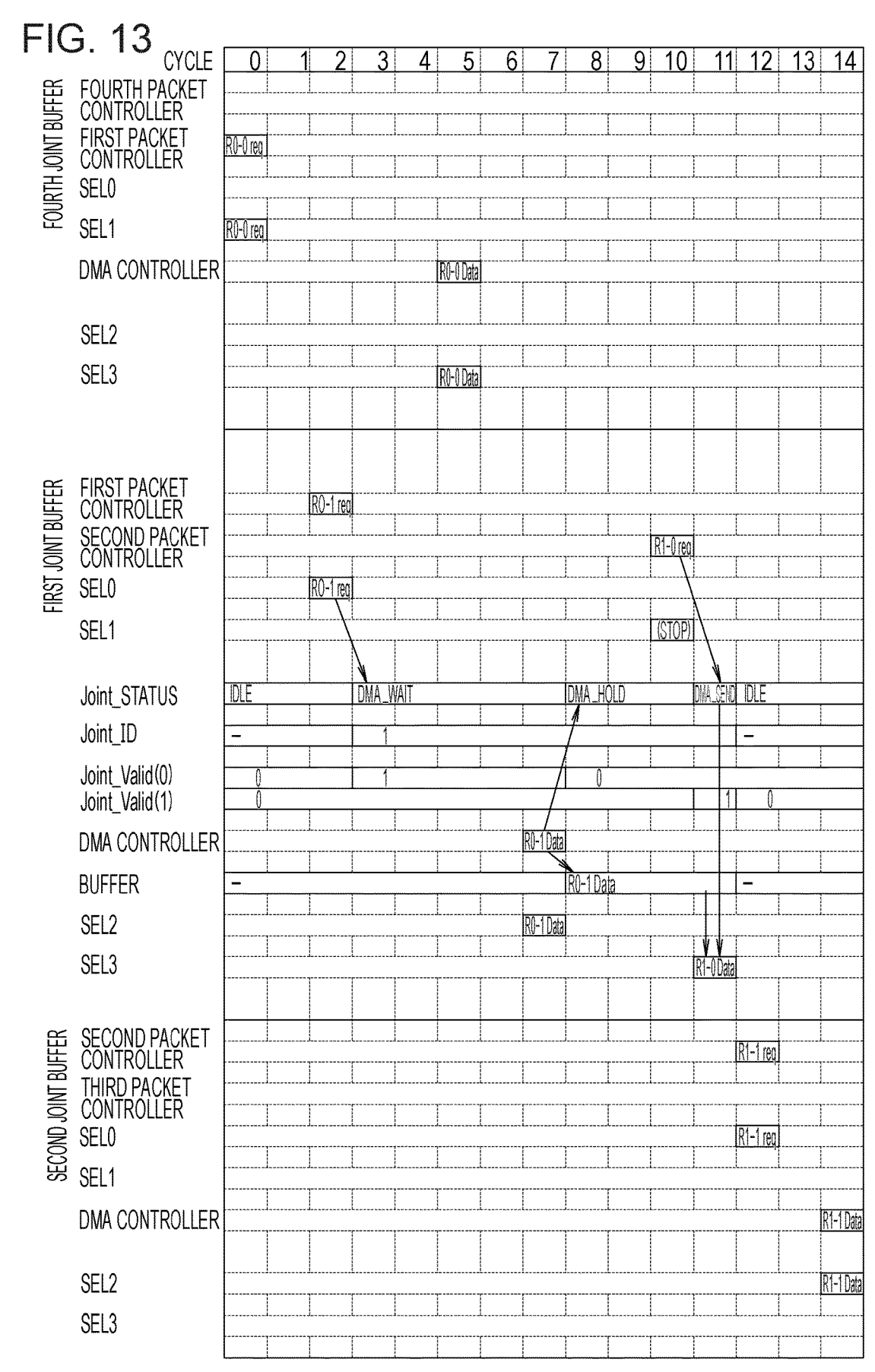

FIG. 13 is a time chart illustrating a processing example of the network controller 113 corresponding to step S1209 of FIG. 12. In a cycle 0, the fourth joint buffer 501d receives a head readout request R0-0 for the packet "a" from the first packet controller 202a. In the head readout request R0-0, the head adjacency flag VF(F) is 0 and the head identifier ID(F) is 0. The selector SEL1 of the fourth joint buffer 501d outputs the received head readout request R0-0 to the DMA controller 205.

In the first joint buffer 501a in the cycle 0, the state Joint_STATUS is IDLE and the adjacency flags Joint_Valid (0) and Joint_Valid(1) are 0.

In a cycle 2, the first joint buffer 501a receives an end readout request R0-1 for the packet "a" from the first packet controller 202a. In the end readout request R0-1, the end adjacency flag VF(L) is 1 and the end identifier ID(L) is 1. The selector SEL0 of the first joint buffer 501a outputs the received end readout request R0-1 to the DMA controller 205.

In a cycle 3, the first joint buffer 501a updates the state Joint_STATUS to DMA_WAIT, registers the end identifier ID(L)=1 as the identifier Joint_ID, and sets the adjacency flag Joint_Valid(0) to 1.

In a cycle 5, the fourth joint buffer 501d receives, from the DMA controller 205, the readout unit block 301 read out in response to the head readout request R0-0. The selector SEL3 of the fourth joint buffer 501d outputs the received readout unit block 301 to the first packet buffer 203a.

In a cycle 7, the first joint buffer 501a receives, from the DMA controller 205, the readout unit block 302 read out in response to the end readout request R0-1. The selector SEL2 of the first joint buffer 501a outputs the received readout unit block 302 to the first packet buffer 203a because the adjacency flag Joint_Valid(0) is 1.

In a cycle 8, the first joint buffer 501a writes, in the buffer 604, the readout unit block 302 read out in response to the end readout request R0-1 because the state Joint_STATUS is DMA_WAIT and the end identifier ID(L)=1 is the same as the identifier Joint_ID=1. The first joint buffer 501a updates the state Joint_STATUS to DMA_HOLD and resets the adjacency flag Joint_Valid(0) to 0.

In a cycle 10, the first joint buffer 501a receives a head readout request R1-0 for the packet "b" from the second packet controller 202b. In the head readout request R1-0, the head adjacency flag VF(F) is 1 and the head identifier ID(F) is 1. The selector SEL1 of the first joint buffer 501a does not output the received head readout request R1-0 to the DMA controller 205 because the state Joint_STATUS is DMA_HOLD and the head identifier ID(F)=1 is the same as the identifier Joint_ID=1.

In a cycle 11, the first joint buffer 501a updates the state Joint_STATUS to DMA_SEND and sets the adjacency flag Joint_Valid(1) to 1. The selector SEL3 of the first joint buffer 501a outputs the readout unit block 302 retained in the buffer 604 to the second packet buffer 203b in response to the head readout request R1-0 because the state Joint_STATUS is DMA_SEND and the adjacency flag Joint_Valid(1) is 1.

In a cycle 12, the first joint buffer 501a updates the state Joint_STATUS to IDLE and resets the adjacency flag Joint_Valid(1) to 0.

The second joint buffer 501b receives an end readout request R1-1 for the packet "b" from the second packet controller 202b. In the following explanation, in the end readout request R1-1, the end adjacency flag VF(L) is 0 and the head identifier ID(F) is 2. The selector SEL0 of the second joint buffer 501b outputs the received end readout request R1-1 to the DMA controller 205.

In a cycle 14, the second joint buffer 501b receives, from the DMA controller 205, the readout unit block 303 read out in response to the end readout request R1-1. The selector SEL2 of the second joint buffer 501b outputs the received readout unit block 303 to the second packet buffer 203b.

Figure 14:
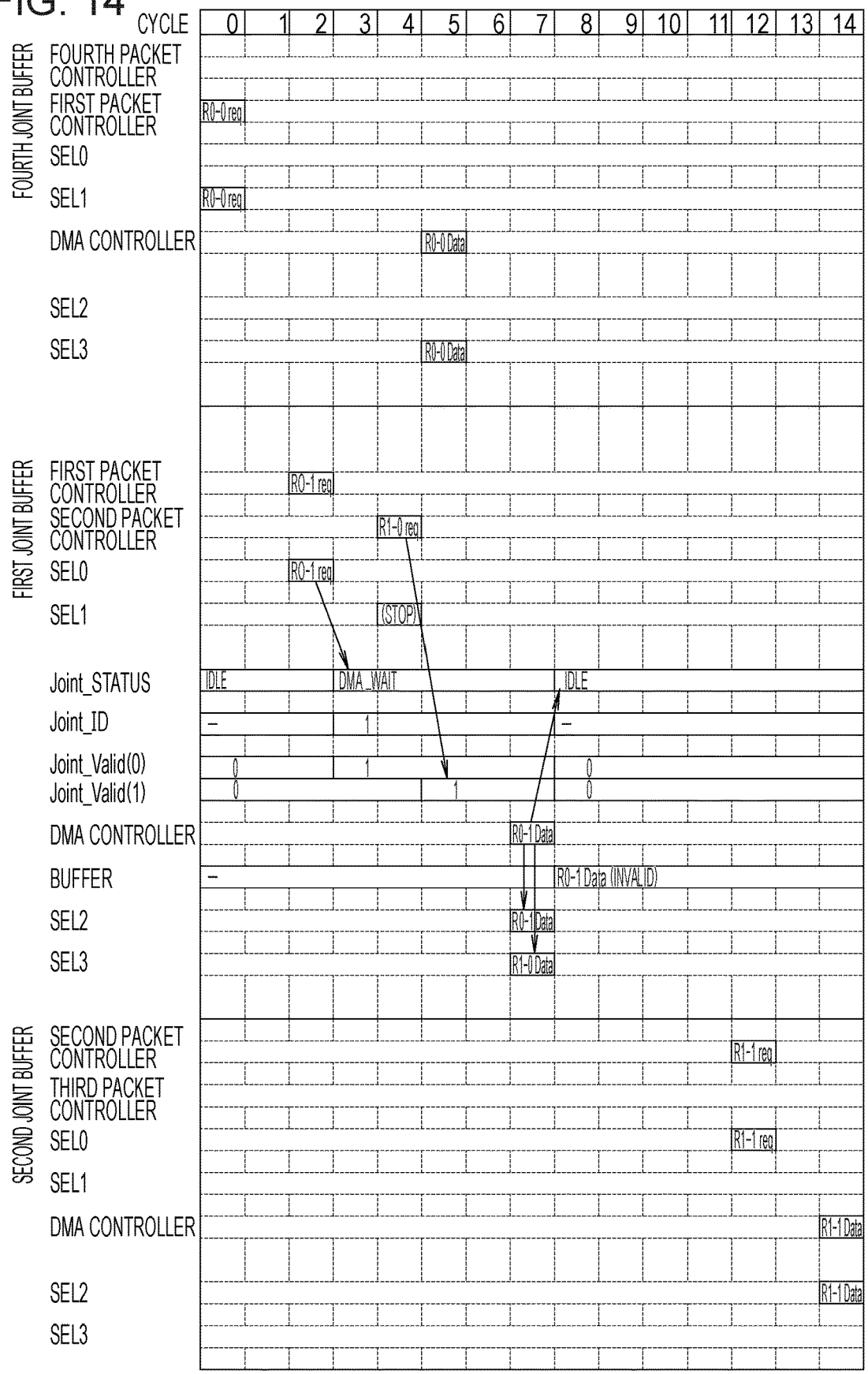
FIG. 14 is a time chart illustrating another processing example of the network controller.

FIG. 14 is a time chart illustrating a processing example of the network controller 113 corresponding to step S1208 in FIG. 12. In a cycle 0, the fourth joint buffer 501d receives the head readout request R0-0 for the packet "a" from the first packet controller 202a. In the head readout request R0-0, the head adjacency flag VF(F) is 0 and the head identifier ID(F) is 0. The selector SEL1 of the fourth joint buffer 501d outputs the received head readout request R0-0 to the DMA controller 205.

In the first joint buffer 501a in the cycle 0, the state Joint_STATUS is IDLE and the adjacency flags Joint_Valid (0) and Joint_Valid(1) are 0.

In a cycle 2, the first joint buffer 501a receives the end readout request R0-1 for the packet "a" from the first packet controller 202a. In the end readout request R0-1, the end adjacency flag VF(L) is 1 and the end identifier ID(L) is 1. The selector SEL0 of the first joint buffer 501a outputs the received end readout request R0-1 to the DMA controller 205.

In a cycle 3, the first joint buffer 501a updates the state Joint_STATUS to DMA_WAIT, registers the end identifier ID(L)=1 as the identifier Joint_ID, and sets the adjacency flag Joint_Valid(0) to 1.

In a cycle 4, the first joint buffer 501a receives the head readout request R1-0 for the packet "b" from the second packet controller 202b. In the head readout request R1-0, the head adjacency flag VF(F) is 1 and the head identifier ID(F) is 1. The selector SEL1 of the first joint buffer 501a does not output the received head readout request R1-0 to the DMA controller 205 because the Joint_STATUS is DMA_WAIT and the head identifier ID(F)=1 is the same as the identifier Joint_ID=1.

In a cycle 5, the first joint buffer 501a sets the adjacency flag Joint_Valid(1) to 1.

The fourth joint buffer 501d receives, from the DMA controller 205, the readout unit block 301 read out in response to the head readout request R0-0. The selector SEL3 of the fourth joint buffer 501d outputs the received readout unit block 301 to the first packet buffer 203a.

In a cycle 7, the first joint buffer 501a receives, from the DMA controller 205, the readout unit block 302 read out in response to the end readout request R0-1. The selector SEL2 of the first joint buffer 501a outputs the received readout unit block 302 to the first packet buffer 203a because the adjacency flag Joint_Valid(0) is 1. The selector SEL3 of the first joint buffer 501a outputs the received readout unit block 302 to the second packet buffer 203b because the adjacency flag Joint_Valid(1) is 1.

In a cycle 8, the first joint buffer 501*a* writes, in the buffer 604, the readout unit block 302 read out in response to the end readout request R0-1 because the state Joint_STATUS is DMA_WAIT and the end identifier ID(L)=1 is the same as the identifier Joint_ID=1. However, the readout unit block 302 of the buffer 604 is not used. The first joint buffer 501*a* updates the state Joint_STATUS to DMA_IDLE and resets the adjacency flags Joint_Valid(0) and Joint_Valid(1) to 0.

In a cycle 12, the second joint buffer 501*b* receives the end readout request R1-1 for the packet "b" from the second packet controller 202*b*. In the following explanation, in the end readout request R1-1, the end adjacency flag VF(L) is 0 and the head identifier ID(F) is 2. The selector SEL0 of the second joint buffer 501*b* outputs the received end readout request R1-1 to the DMA controller 205.

In a cycle 14, the second joint buffer 501*b* receives, from the DMA controller 205, the readout unit block 303 read out in response to the end readout request R1-1. The selector SEL2 of the second joint buffer 501*b* outputs the received readout unit block 303 to the second packet buffer 203*b*.

As explained above, the network controller 113 reads out the respective readout unit blocks 301 to 307 of the memory 102*a* once and causes the first to fourth joint buffers 501*a* to 501*d* to retain the readout unit blocks 302 to 307. The first to fourth packet controllers 202*a* to 202*d* may obtain required readout unit blocks 302 to 307 from the first to fourth joint buffers 501*a* to 501*d*. Consequently, the readout efficiency and the throughput of the memory 102*a* are improved.

The first to fourth joint buffers 501*a* to 501*d* have a small mounting area and are easily controlled compared with a large-capacity cache. Consequently, the central processing units 101*a* to 101*d* may be respectively highly integrated.

Note that the embodiment simply describes an example of materialization in carrying out the present disclosure. The technical scope of the present disclosure should not be limitedly interpreted by the embodiment. That is, the present disclosure may be carried out in various forms without departing from the technical idea or main features of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data transfer device that transfers data from a first memory, the data transfer device comprising:
    a processor configured to divide a data transfer request that requests transfer of the data from the first memory to a second memory into a plurality of transfer requests, each of the plurality of transfer request requesting transfer of a portion of the data from the first memory to the second memory, the plurality of transfer requests including a first transfer request and a second transfer request and, when an end address of readout data based on the first transfer request is adjacent to a head address of readout data based on the second transfer request in the first memory, set end adjacency information in the first transfer request and set head adjacency information in the second transfer request;
    a first request controller configured to, when the end adjacency information is set in the first transfer request, set first adjacency information in a first readout request corresponding to a readout end address based on the first transfer request and output the first readout request in which the first adjacency information is set;
    a second request controller configured to, when the head adjacency information is set in the second transfer request, set second adjacency information in a second readout request corresponding to a readout head address based on the second transfer request and output the second readout request in which the second adjacency information is set; and
    a first buffer configured to, when the first readout request is input to the first buffer and the first adjacency information is set in the first readout request, output the first readout request to the first memory, retain first readout data read out from the first memory in response to the first readout request, and output the first readout data to the first request controller and, when the second readout request is input to the first buffer and the second adjacency information is set in the second readout request, output the retained first readout data to the second request controller.

2. The data transfer device according to claim 1, wherein:
    the processor divides the data transfer request into a plurality of transfer requests including a first transfer request, a second transfer request, and a third transfer request and, when an end address of readout data based on the second transfer request is adjacent to a head address of readout data based on the third transfer request in the first memory, sets end adjacency information in the second transfer request and sets head adjacency information in the third transfer request;
    when the end adjacency information is set in the second transfer request, the second request controller sets third adjacency information in a third readout request corresponding to a readout end address based on the second transfer request and outputs the third readout request in which the third adjacency information is set; and
    the data transfer device further comprises:
        a third request controller configured to, when the head adjacency information is set in the third transfer request, set fourth adjacency information in a fourth readout request corresponding to a readout head address based on the third transfer request and output the fourth readout request in which the fourth adjacency information is set, and
        a second buffer configured to, when the third readout request is input to the second buffer and the third adjacency information is set in the third readout request, output the third readout request to the first memory, retain second readout data read out from the first memory in response to the third readout request, and output the second readout data to the second request controller and, when the fourth readout request is input to the second buffer and the fourth adjacency information is set in the fourth readout request, output the retained second readout data to the third request controller.

3. The data transfer device according to claim 1, wherein, when the first readout request is input to the first buffer and the first adjacency information is set in the first readout request, the first buffer outputs the first readout request to the first memory and, when the second readout request is input to the first buffer and the second adjacency information is set in the second readout request, the first buffer outputs the first readout data read out from the first memory in response to the first readout request to the first request controller and the second request controller.

4. The data transfer device according to claim 1, wherein, when the second adjacency information is set in the second readout request, the first buffer does not output the second readout request to the first memory and outputs the retained first readout data to the second request controller.

5. The data transfer device according to claim 1, wherein:
when an end address of readout data based on the first transfer request is adjacent to a head address of readout data based on the second transfer request in the first memory, the processor sets the end adjacency information and a first identifier in the first transfer request and sets the head adjacency information and the first identifier in the second transfer request;
when the end adjacency information and the first identifier are set in the first transfer request, the first request controller sets the first adjacency information and the first identifier in a first readout request corresponding to a readout end address based on the first transfer request and outputs the first readout request in which the first adjacency information and the first identifier are set;
when the head adjacency information and the first identifier are set in the second transfer request, the second request controller sets the second adjacency information and the first identifier in a second readout request corresponding to a readout head address based on the second transfer request and outputs the second readout request in which the second adjacency information and the first identifier are set; and
when the first readout request is input to the first buffer and the first adjacency information and the first identifier are set in the first readout request, the first buffer registers the first identifier, outputs the first readout request to the first memory, retains the first readout data read out from the first memory in response to the first readout request, and outputs the first readout data to the first request controller and, when the second readout request is input to the first buffer, the second adjacency information is set in the second readout request, and the first identifier set in the second readout request is the same as the registered first identifier, the first buffer outputs the retained first readout data to the second request controller.

6. The data transfer device according to claim 1, wherein:
the first request controller does not set adjacency information in a fifth readout request corresponding to a readout head address based on the first transfer request and output the fifth readout request; and
the data transfer device further comprises a third buffer configured to, when the adjacency information is not set in the fifth readout request, output the fifth readout request to the first memory and output readout data read out from the first memory in response to the fifth readout request to the first request controller.

7. The data transfer device according to claim 1, wherein the first request controller outputs a first packet including a part of the first readout data to a second memory, and the second request controller outputs a second packet including another part of the first readout data to the second memory.

8. The data transfer device according to claim 7, wherein payload lengths of the first packet and the second packet are respectively a write unit block length of the second memory.

9. The data transfer device according to claim 7, wherein payload lengths of the first packet and the second packet are respectively a maximum transferable payload length.

10. An apparatus comprising:
a first memory; and
a data transfer device that transfers data from the first memory, the data transfer device comprising:
a processor configured to divide a data transfer request that requests transfer of the data from the first memory to a second memory into a plurality of transfer requests, each of the plurality of transfer requests requesting transfer of a portion of the data from the first memory to the second memory, the plurality of the transfer requests including a first transfer request and a second transfer request and, when an end address of readout data based on the first transfer request is adjacent to a head address of readout data based on the second transfer request in the first memory, set end adjacency information in the first transfer request and set head adjacency information in the second transfer request,
a first request controller configured to, when the end adjacency information is set in the first transfer request, set first adjacency information in a first readout request corresponding to a readout end address based on the first transfer request and output the first readout request in which the first adjacency information is set,
a second request controller configured to, when the head adjacency information is set in the second transfer request, set second adjacency information in a second readout request corresponding to a readout head address based on the second transfer request and output the second readout request in which the second adjacency information is set, and
a first buffer configured to, when the first readout request is input to the first buffer and the first adjacency information is set in the first readout request, output the first readout request to the first memory, retain first readout data read out from the first memory in response to the first readout request, and output the first readout data to the first request controller and, when the second readout request is input to the first buffer and the second adjacency information is set in the second readout request, output the retained first readout data to the second request controller.

11. A method performed by a data transfer device that transfers data from a first memory, the method comprising:
causing a processor to divide a data transfer request that requests transfer of the data from the first memory to a second memory into a plurality of transfer requests, each of the plurality of transfer requests requesting transfer of a portion of the data from the first memory to the second memory, the plurality of the transfer requests including a first transfer request and a second transfer request and, when an end address of readout data based on the first transfer request is adjacent to a head address of readout data based on the second transfer request in the first memory, set end adjacency information in the first transfer request and set head adjacency information in the second transfer request;
causing a first request controller to, when the end adjacency information is set in the first transfer request, set first adjacency information in a first readout request corresponding to a readout end address based on the first transfer request and output the first readout request in which the first adjacency information is set;

causing a second request controller to, when the head adjacency information is set in the second transfer request, set second adjacency information in a second readout request corresponding to a readout head address based on the second transfer request and output the second readout request in which the second adjacency information is set; and causing a first buffer to, when the first readout request is input to the first buffer and the first adjacency information is set in the first readout request, output the first readout request to the first memory, retain first readout data read out from the first memory in response to the first readout request, and output the first readout data to the first request controller and, when the second readout request is input to the first buffer and the second adjacency information is set in the second readout request, output the retained first readout data to the second request controller.

12. A data transfer device that transfers data from a first memory to a second memory, the data transfer device comprising:

a processor configured to divide a data transfer request that requests transfer of the data from the first memory to a second memory into a plurality of transfer requests, each of the plurality of transfer requests requesting transfer of a portion of the data from the first memory to the second memory, the plurality of the transfer requests including a first transfer request and a second transfer request and, when an end address of readout data based on the first transfer request is adjacent to a head address of readout data based on the second transfer request in the first memory, set end adjacency information in the first transfer request and set head adjacency information in the second transfer request;

a first request controller configured to, when the end adjacency information is set in the first transfer request, set first adjacency information in a first readout request corresponding to a readout end address based on the first transfer request and output the first readout request in which the first adjacency information is set;

a second request controller configured to, when the head adjacency information is set in the second transfer request, set second adjacency information in a second readout request corresponding to a readout head address based on the second transfer request and output the second readout request in which the second adjacency information is set; and a first buffer configured to, when the first readout request is input to the first buffer and the first adjacency information is set in the first readout request, output the first readout request to the first memory, retain first readout data read out from the first memory in response to the first readout request, and output the first readout data to the first request controller and, when the second readout request is input to the first buffer and the second adjacency information is set in the second readout request, output the retained first readout data to the second request controller, wherein the first request controller outputs a first packet including a part of the first readout data to the second memory, and the second request controller outputs a second packet including another part of the first readout data to the second memory.

\* \* \* \* \*